US007353104B2

(12) United States Patent
Nishimura

(10) Patent No.: US 7,353,104 B2
(45) Date of Patent: Apr. 1, 2008

(54) SIGNAL OUTPUT UNIT AND ELECTRONIC CONTROL UNIT

(75) Inventor: Tadaharu Nishimura, Oobu (JP)

(73) Assignee: Denso Corporation, Kariya, Aichi-pref. (JP)

( * ) Notice: Subject to any disclaimer, the term of this patent is extended or adjusted under 35 U.S.C. 154(b) by 37 days.

(21) Appl. No.: 11/504,071

(22) Filed: Aug. 15, 2006

(65) Prior Publication Data

US 2007/0050123 A1 Mar. 1, 2007

(30) Foreign Application Priority Data

Aug. 29, 2005 (JP) ............................ 2005-247813

(51) Int. Cl.
*F02D 45/00* (2006.01)
*G06F 19/00* (2006.01)
*F02M 51/00* (2006.01)

(52) U.S. Cl. ........................ 701/103; 701/110; 123/488

(58) Field of Classification Search ................ 701/103, 701/110, 115, 102; 123/480, 488
See application file for complete search history.

(56) References Cited

U.S. PATENT DOCUMENTS 4,236,213 A * 11/1980 Richardson ................. 701/102
4,367,530 A * 1/1983 Morinaga et al. ........... 701/115
5,109,820 A * 5/1992 Iwata et al. ............ 123/406.37
6,445,998 B2 9/2002 Ando
6,493,628 B2 12/2002 Ando

FOREIGN PATENT DOCUMENTS

DE 36 10 717 A * 10/1987
JP H 04-136451 5/1992
JP H 11-23320 1/1999
JP 2001-200747 7/2001
JP 2001-214790 8/2001
JP 2001-271700 10/2001

* cited by examiner

*Primary Examiner*—Hieu T. Vo
(74) *Attorney, Agent, or Firm*—Nixon & Vanderhye P.C.

(57) ABSTRACT

A timer module in an ECU has an angle counter and a timer counter. A value counted by the angle counter indicates a crank angle of a crankshaft. Under the control of the termination to output an ignition pulse signal to an igniter, the ECU inverts the level of the ignition pulse signal to Low level (as an inactive mode) when a first comparator outputs an angle comparison matching signal after a value of the angle counter reaches a pulse OFF angle "an12" count value of the angle counter, and when a second comparator outputs a time comparison matching signal after the value of the time counter reaches a time "t12" as an elapsed time of a regular time length "TH" counted from a pulse ON time "t11". Thus, even if the crank angle of the crankshaft reaches the pulse OFF angle "an12" before the timing "t12", the ECU keeps High level of the ignition pulse signal until the timing "t12".

10 Claims, 13 Drawing Sheets

FIG. 3A

SETTING OPERATION MODE OF SWITCH CIRCUIT 38

| OPERATION MODE | PULSE ON TRIGGER SIGNAL | PULSE OFF TRIGGER SIGNAL |
|---|---|---|
| 0 | NONE | NONE |
| 1 | NONE | TIME COMPARISON MATCHING SIGNAL |
| 2 | ANGLE COMPARISON MATCHING SIGNAL | NONE |
| 3 | ANGLE COMPARISON MATCHING SIGNAL | TIME COMPARISON MATCHING SIGNAL |
| 4 | LOGICAL AND OF ANGLE COMPARISON MATCHING SIGNAL AND TIME COMPARISON MATCHING SIGNAL | NONE |
| 5 | NONE | LOGICAL AND OF ANGLE COMPARISON MATCHING SIGNAL AND TIME COMPARISON MATCHING SIGNAL |

FIG. 3B

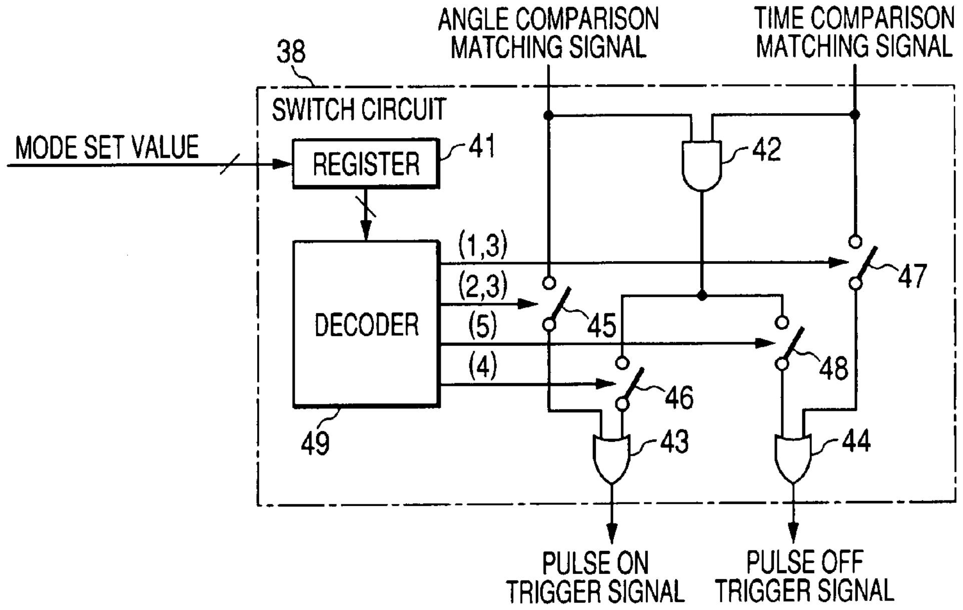

SIGNAL OUTPUT UNIT AND ELECTRONIC CONTROL UNIT

CROSS-REFERENCE TO RELATED APPLICATIONS

This application is related to and claims priority from Japanese Patent Application No. 2005-247813 filed on Aug. 29, 2005, the contents of which are hereby incorporated by reference.

BACKGROUND OF THE INVENTION

1. Field of the Invention

The present invention generally relates to a signal output unit such as a timer module and an electronic control unit such as an engine control unit (ECU) equipped with the signal output unit, capable of switching a level of an output signal according to a rotation angle of a rotary body.

2. Description of the Related Art

An electronic control unit such as an engine control unit (ECU) for controlling the operation of a vehicle engine such as an internal combustion engine mounted on a vehicle inputs a crank signal transferred from a crank sensor. The crank signal has an edge generated every a specified angle corresponding to the rotation of a crankshaft of the engine. The ECU instructs an angle counter so that it counts up based on every receiving the crank signal. This angle counter outputs a rotation angle (as a crank angle) of the crankshaft in a cycle of the engine. The ECU monitors the crank angle based on the counted value of the angle counter and outputs an instruction signal to active an injector (or a fuel injection valve) and an igniter (or an ignition unit).

For example, three patent documents have disclosed such a conventional technique about the ECU, the Japanese patent laid open publications, No. P 2001-200747, JP 2001-214790, and JP 2001-271700.

A description will now be given of the configuration of hardware and a manner thereof configured to output an injection pulse signal to operate the injector with reference to FIGS. 13A and 13B.

FIG. 13A is a block diagram showing a schematic configuration of a hardware circuit capable of outputting an injection pulse signal. The hardware circuit consists of an angle counter 101, a comparison matching register 103, a comparator 105, and a down counter 107. A central processing unit (CPU, omitted from the drawings) sets a value to the comparison matching register 103 to be compared with the value stored in the angle counter 101.

When comparing the value stored in the angle counter 101 with the value stored in the comparison matching register 103 and the comparison result indicates that the value stored in the angle counter 101 reaches the value set in the comparison matching register 103, the comparator 105 outputs a comparison matching signal to the down counter 107. The CPU sets a data item corresponding to an optional time length to the down counter 107 in advance. The down counter 107 receives the comparison matching signal transferred from the comparator 105 as a pulse ON trigger signal. The pulse ON trigger signal changes the level of the output signal of the down counter 107, as an injection pulse signal, to an active voltage level by which the fuel injection valve becomes open.

Under the condition in which the active voltage level of the injection pulse signal is High level, when receiving the comparison matching signal transferred from the comparator 105, the down counter 107 switches Low level of its output signal to High level, and initiates the counting down operation from the value stored in advance therein. When the counting down operation reaches zero, namely, when the time length corresponding to the pre-set value has elapsed, the down counter 107 provides Low level of its output signal switched from High level.

As shown in FIG. 13B, the CPU (omitted from FIG. 13A and FIG. 13B) sets the injection start angle "an1" of the fuel injection valve to the comparison matching register 103 and sets the fuel injection time length "Tf1" to the down counter 107 in advance. The fuel injection time length "Tf1" corresponds to the time length of High level of the injection pulse signal and also corresponds to the open time length of the fuel injection valve.

When the crank angle of the crankshaft reaches the injection start angle "an1", and the comparator 105 outputs the comparison matching signal to the down counter 107, the down counter 107 receives the comparison matching signal and outputs the injection pulse signal of High level (as its output signal). The fuel injection process thereby initiates. After this, when the fuel injection time length "Tf1" has elapsed and the count value of the down counter 107 reaches zero, the down counter 107 outputs the injection pulse signal (as its output signal) of Low level. This indicates the completion of the fuel injection process.

As shown in FIG. 13B, there is split injection in which the amount of injection to each cylinder is divided into plural injections, for example, into two injections in this explanation. On performing such a split injection, the CPU sets an injection start angle "an2" for the secondary injection to the comparison matching register 103 at the timing "tof1" (see FIG. 13B) at which the injection pulse signal for the primary fuel injection is switched from High level to Low level. The CPU further sets the value corresponding to the secondary fuel injection timing "Tf2" to the down counter 107 in advance.

However, the split injection process has a timing limitation. It is necessary to keep the time interval between both the injection pulse signals for the primary and secondary fuel injections (namely, the time interval counted from High level to following Low level) by a regular length "TL". On such a timing limitation between the primary injection and secondary injection, the CPU performs following process (1) and process (2) at the timing "tof1" at which the injection pulse signal is switched from High level to Low level for the primary fuel injection.

(1) At first, the CPU calculates the crank angle "an3" when the regular time length "TL" has been elapsed counted from the current timing "tof1" based on the rotation speed of the crankshaft currently detected at this timing; and (2) The calculated crank angle "an3" is then compared with the injection start angle "an2" for the secondary injection. When the injection start angle "an2" is latter in angle than the calculated crank angle "an3", the injection start angle "an2" is set to the comparison matching register 103. If the calculated crank angle "an3" is later in angle than the injection start angle "an2", the calculated injection start angle "an3" is set to the comparison matching register 103. FIG. 13B shows the former case.

Both the processes (1) and (2) realize the protection to keep the optimum signal output start timing so that the down counter 107 does not output the secondary injection pulse signal until the elapse of the regular time length "TL" counted from the change of the primary injection pulse signal to Low level.

There is another conventional technique to determine the timing of a fuel injection start or the timing of a fuel injection completion by using a timer means and to perform the completion of the fuel injection or the start of the fuel injection in synchronization with the operation of an engine of a vehicle. For example, the Japanese patent laid open publication JP H4-136451 has disclosed such a technique.

By the way, those prior art techniques as explained above with reference to FIGS. 13A and 13B, involve following drawbacks:

(a) Increasing the processing load of CPU; and (b) Possibility not to keep the limitation regarding the regular time length "TL" when the number of rotation of the crankshaft is increased even if the injection start angle "an2" is set to the comparison matching register 103 when the CPU judges the secondary injection start angle "an2" is later than the calculated crank angle "an3" as the execution result of the above (2). That is, the actual crank angle becomes equal to the injection start angle "an2" and the secondary injection pulse signal is thereby switched to High level before the elapse of the regular time length "TL" counted from the change to Low level of the injection pulse signal for the primary fuel injection when increasing the rotation speed of the crankshaft.

In order to avoid such a drawback, there is another conventional technique to set to the comparison matching register 103 a time equivalent value obtained by converting the injection start angle, where a timing counter performing counting every a constant time length is compared with the comparison matching register 103, not with the angle counter 101. That is, this technique controls the output start timing (the timing to change High level) to output the injection start angle based on time, not based on the timing of the crank angle obtained by the angle counter 101.

However, such a conventional technique cannot set the output start timing to output the injection pulse signal based on the crank angle although it can keep the timing limitation of the regular time length "TL". As a result, such a technique causes a mismatching between the output start timing to output the injection pulse signal and a target injection start angle. This technique deteriorates the accuracy of the fuel injection control greatly and is therefore not realistic manner.

SUMMARY OF THE INVENTION

It is an object of the present invention to provide a signal output unit and an electronic control unit equipped with the signal output unit capable of keeping a timing limitation certainly with reduced load of a CPU, in which the level of an output signal is not switched until the elapse of a regular time length, namely, is switched only after the elapse of the regular time length, even if the rotation angle of a rotary body such as a crankshaft reaches a target angle to allow the inverse of the level of the output signal.

To achieve the above purposes, the present invention provides a signal output unit having angle counter, a first register, a first comparator, a time counter, a second register, and a second comparator. The angle counter is configured to perform a count operation in synchronization with a rotation of a rotary body and to output an angle count value indicating a rotation angle of the rotary body. The first register in which a first comparison value is set is compared with the angle count value. The first comparator is configured to compare the angle count value with the first comparison value, and to output a first comparison matching signal when the angle counter value reaches the first comparison value. The time counter is configured to perform a counting operation every a regular interval and to output a time count value. The second register in which a second comparison value is set is compared with the time count value. The second comparator is configured to compare the time count value with the second comparison value, and to output a second comparison matching signal when the time count value reaches the second comparison value. The signal output unit is configured to invert a specified level of its output signal, and to output the output signal of the inverted level outside when the first comparator outputs the first comparison matching signal and the second comparator outputs the second comparison matching signal. The signal output unit realizes a time limitation function in which the signal output unit keeps the level of the output signal until a specified regular time length counted from a predetermined reference timing is elapsed even if the rotation angle of the rotary body reaches a target angle at which the level of the output signal should be switched from the specified level. In order to perform such a time limitation function, the signal output unit sets to the first register the value corresponding to the target angle at which the level of the output signal should be switched. Further, the signal output unit sets to the second register an addition value obtained by adding the count value of the regular time length to the value of the time counter at the predetermined reference timing (that is, a predicted value of the time counter when the regular time length is elapsed from the predetermined reference timing).

On performing the above setting to the first and second registers, the first comparator outputs the first comparison matching signal when the rotation angle of the rotary body reaches the target angle, and the second comparator outputs the second comparison matching signal when the regular time length is elapsed from the predetermined reference timing. When the rotation angle of the rotary body reaches the target angle after the regular time length counted from the predetermined reference timing is elapsed, the level of the output signal is switched when the rotation angle of the rotary body reaches the target angle (namely, the first comparator outputs the first comparison matching signal). On the contrary, when the rotation angle of the rotary body reaches the target angle before the regular time length counted from the predetermined reference timing is elapsed, the level of the output signal is switched from the specified level when the regular time length is elapsed from the predetermined reference timing (namely, the second comparator outputs the first comparison matching signal).

According to the signal output unit of the present invention, it is possible to realize such a time limitation function with reduced processing load of a CPU and improved accuracy without fluctuation of the rotation speed of the rotary body.

According to the signal output unit as another aspect of the present invention, the predetermined specified level of the output signal of the signal output unit is a level (as non-active level) indicating an interruption of an electric power supply to a control target to be controlled according to the output signal, and the inverted level (as active level) of the output signal indicates the initiation of the electric power to the control target. The target angle at which the level of the output signal is switched is the angle at which the non-active level of the output signal is switched to the active level. In other words, such a target angle is the angle to initiate the output of the output signal.

Thus, according to the signal output unit of the present invention, it is possible to realize, namely, to satisfy the time limitation function (in other words, its means a protection function for controlling the initiation of the signal output) with reduced load of the CPU, by which the signal output unit halts the supply of the output signal until the regular time length counted from the predetermined reference timing is elapsed.

Further, according to the signal output unit as another aspect of the present invention, the specified level of the output signal from the signal output unit is a level (as active level) indicating the initiation of electric power supply to the control target to be controlled according to the output signal, and the inverted level of the output signal is a level (as non-active level) indicating the interruption of the electric power supply to the control target. The target angle at which the level of the output signal is switched is the angle when the active level of the output signal is switched to the non-active level. In other words, such a target angle is a completion angle to terminate the output of the output signal.

Thus, according to the signal output unit of the present invention, it is possible to realize, namely, to satisfy the time limitation function (in other words, its means a protection function for controlling the termination of the signal output) with reduced load of the CPU, by which the signal output unit continuously supplies the output signal until the regular time length counted from the predetermined reference timing is elapsed.

It is possible to form an electronic control unit equipped with such a signal output unit described above capable of realizing the time limitation function. According to the present invention, the electronic control unit has the above signal output unit and a controller having a register value setting means. The register value setting means stores to the first register the target angle of the rotary body as an output-inversion angle at which the level of the output signal from the signal output unit is inverted from the predetermined level to its inversion level. The register value setting means adds a count value for a regular time period counted by the time counter to a count value of the time counter at a reference timing at a specified time, and stores the addition result to the second register.

According to another aspect of the present invention, the signal output unit further has a capture register configured to capture the time count value output from the time counter when the first comparator outputs the first comparison match signal.

It is thereby possible to easily obtain through the capture register the accurate value of the time counter at the reference timing when the rotation angle of the rotary body becomes a specified timing before the target angle as the output-inversion angle. It is thereby possible to store the accurate value to the second register.

If the output signal unit is not equipped with any capture register, it is necessary to read immediately the value of the time counter on reaching the reference timing in order to read the value of the time counter at the reference timing. However, it is difficult to obtain the accurate value at the reference timing because of an execution delay in the readout operation.

According to the signal output register incorporating the capture register, when the predetermined angle is stored into the first register before the reference timing occurs, the value of the time counter at the reference timing is captured into the capture register when the first comparator outputs the first comparison match signal on reaching the rotation angle of the rotary body to the specified angle before the target angle as the output-inversion angle. It is thereby possible to obtain the accuracy value at the reference timing only by reading the value stored in the capture register.

According to the electronic control unit equipped with the signal output unit having such a capture register, the reference timing is the timing when the rotation angle of the rotary body reaches the specified angle before the target angle as the output-inversion angle.

Further, the register value set means sets the specified angle into the first register before the reference angle occurs, and reads the value stored in the capture register during the time length from the reference timing to the timing at which the rotation angle of the rotation body reaches the target angle as the output-inversion angle. The register value set means sets to the second register the addition result of adding the count value of the time counter during the regular time length to the readout value from the capture register.

Accordingly, it is possible for the electronic control unit to obtain the accurate value of the time counter at the reference timing through the capture register, and to perform the process satisfying the accurate time limitation function by setting to the second register the prediction value of the time counter when the regular time length counted from the reference timing is elapsed is set.

BRIEF DESCRIPTION OF THE DRAWINGS

A preferred, non-limiting embodiment of the present invention will be described by way of example with reference to the accompanying drawings, in which:

FIG. 3A shows a setting table that indicate the operation of a switch circuit incorporated in the timer module shown in FIG. 2;

FIG. 3B is a block diagram showing a configuration of the switch circuit incorporated in the timer module shown in FIG. 2;

DETAILED DESCRIPTION OF THE PREFERRED EMBODIMENTS

Figure 1:
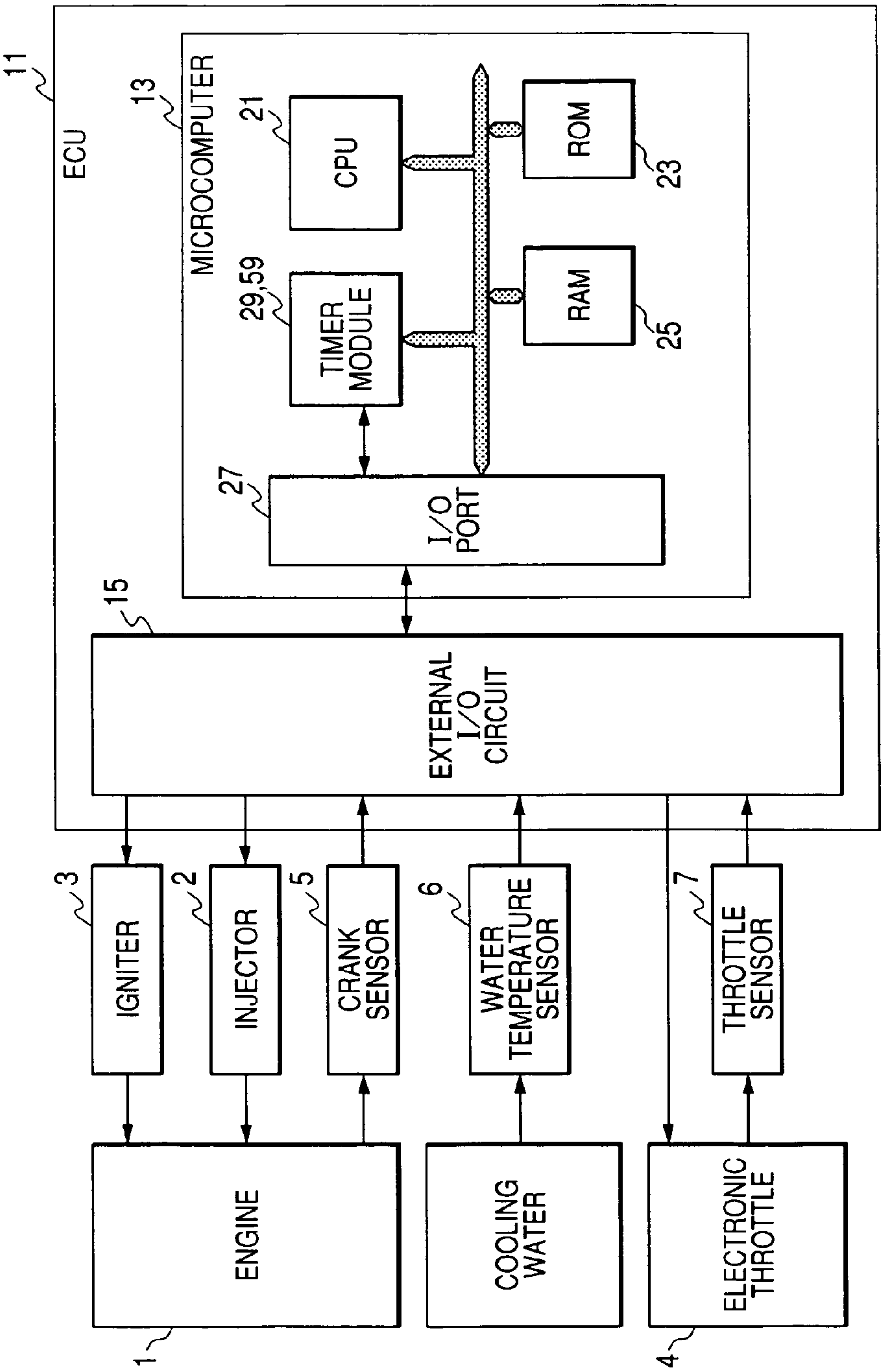
FIG. 1 is a block diagram showing a configuration of an engine control unit (ECU) as an electronic control unit according to a first embodiment of the present invention.

Hereinafter, various embodiments of the present invention will be described with reference to the accompanying drawings. In the following description of the various embodiments, like reference characters or numerals designate like or equivalent component parts throughout the several diagrams.

A description will be given of a configuration of an electronic control unit according to embodiments to which the concept of the present invention is applied. The electronic control unit according to the present invention corresponds to an engine control unit (hereinafter, referred to as "ECU") through the following description of the first and second embodiments.

First Embodiment

FIG. 1 is a block diagram showing a configuration of the ECU 11 according to the first embodiment of the present invention.

As shown in FIG. 1, the ECU 11 is equipped with a microcomputer 13 and an external input/output (I/O) circuit 15. The microcomputer 13 performs various processes for controlling the operation of an engine 1 in a vehicle. The external I/O circuit 15 performs the input and output operation of various signals between the ECU 11 and the microcomputer 13.

The vehicle is equipped with various types of actuators to operate the engine 1 and various types of sensors to detect the operation state of the engine 1 such as an injector 2 (as an electromagnetic type fuel injection valve), an igniter 3 (as an ignition unit), an electronic throttle 4, a crank sensor 5, a water temperature sensor 6, a throttle sensor 7, and so on. The injector 2 injects a fuel into engine cylinders of the engine 1. The igniter 3 ignites spark plugs in the engine 1. The electronic throttle 4 regulates the amount of inlet air into the engine 1. The crank sensor 5 outputs a crank signal having an edge every a regular angle (for example, every 30° CA, where "CA" indicates crank angle) according to rotation of the crankshaft of the engine 1. The water temperature sensor 6 detects the temperature of cooling water for the engine 1. The throttle sensor 7 detects an opening angle of the electronic throttle 4.

The microcomputer 13 inputs various signals such as a crank signal from the crank sensor 5, each signal is switched between Low level and High level after the external I/O circuit 15 rectifies those signals.

The microcomputer 13 inputs analogue signals such as the water temperature sensor 6 and the signal from the throttle sensor 7 after conversion of those analogue signals to digital signals by an A/D converter (not shown).

The microcomputer 13 instructs the external I/O circuit 15 to output driving currents to those various types of the actuators. In particular, the injector 2 opens its valve when receiving the injection pulse signal of High level output from the microcomputer 13. An electric current flows into the igniter 3 during the microcomputer 13 outputs the ignition pulse signal of High level, and the igniter 3 outputs an ignition pulse signal to spark plugs when the microcomputer 13 outputs the ignition pulse signal of Low level switched from High level and the current flowing through the igniter 3 thereby interrupts.

By the way, the microcomputer 13 is equipped with a timer module 29 for outputting the injection pulse signal and the ignition pulse signal in addition to well known units such as a central processing unit (CPU) 21 as a controller, a read only memory (ROM) 23, a random access memory (RAM) 25, and input/output ports 28.

A description will now be given of the timer module 29 as the signal output unit.

Figure 2:
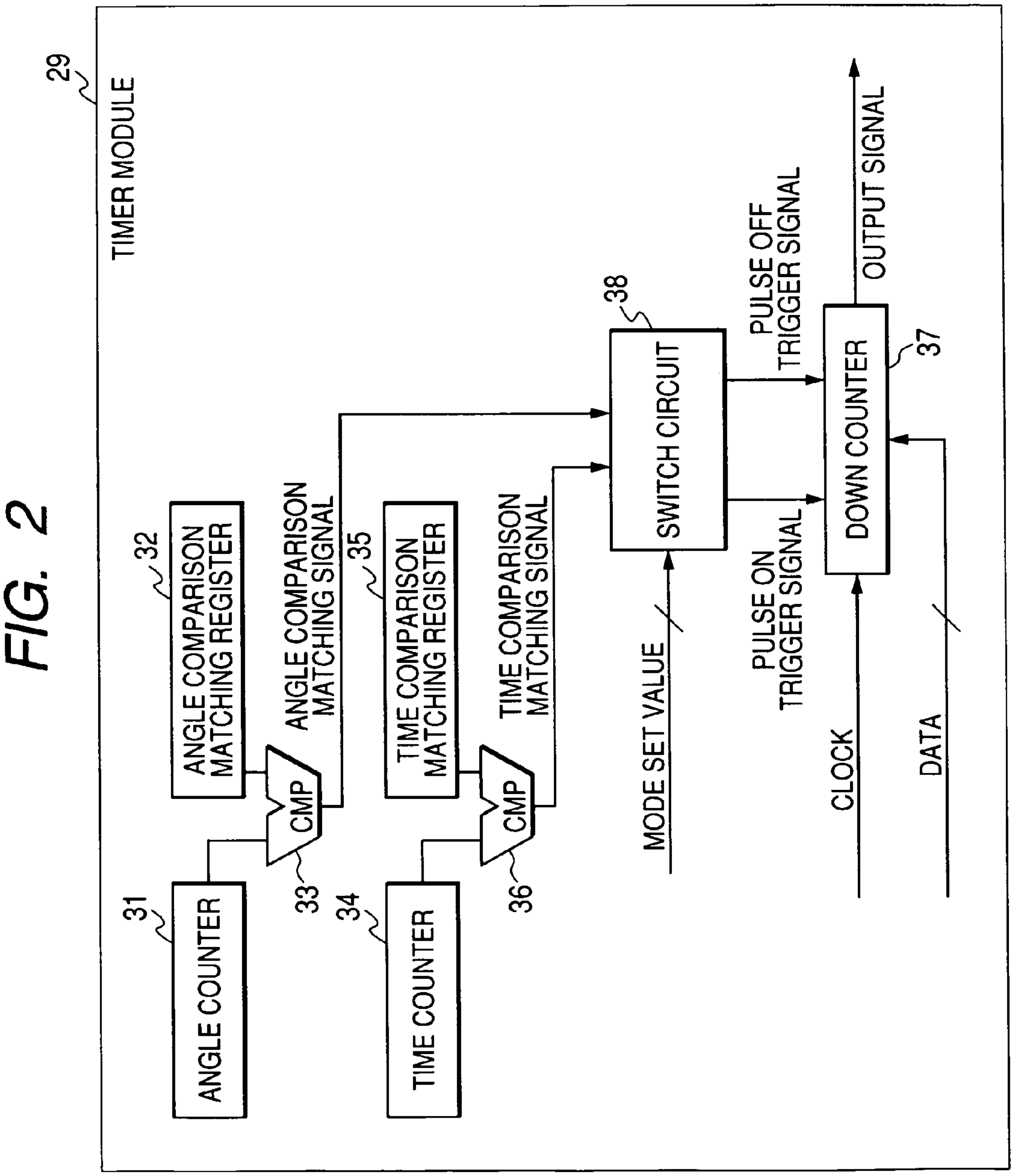
FIG. 2 is a block diagram showing a configuration of a timer module as a signal output unit incorporated in a CPU in the ECU shown in FIG. 1 according to the first embodiment.

FIG. 2 is a block diagram showing a configuration of the timer module 29 incorporated in the CPU 21 mounted on the ECU 11 shown in FIG. 1 according to the first embodiment. As shown in FIG. 2, the timer module 29 has an angle counter 31, an angle comparison matching register 32, a comparator 33, a time counter 34, a time comparison matching register 35, a comparator 36 a down counter 37, and a switch circuit 38. The angle counter 31 operates in synchronization with the rotation of the crankshaft and outputs a counted value indicating a crank angle (that is a rotation angle of the crankshaft per one cycle of the engine 1). The angle comparison matching register 32 stores a value to be compared with the crank angle as the output value of the angle counter 31. The comparator 33 compares the output from the angle counter 31 with the value stored in the angle comparison matching register 32, and outputs an angle comparison matching signal to the switch circuit 38 when the output from the angle counter 31 reaches the value stored in the angle comparison matching register 32. The time counter 34 counts up every a constant time. The time comparison matching register 35 stores a value to be compared with the value stored in the timer counter 34. The comparator 36 compares the value stored in the time counter with the value stored in the time comparison matching register 35, and outputs a time comparison matching signal to the switch circuit 38 when the value stored in the time counter reaches the value stored in the time comparison matching register 35. The down counter 37 outputs an injection pulse signal or an ignition pulse signal. The switch circuit 38 receives the angle comparison matching signal transferred from the comparator 33 and the time comparison matching signal transferred from the comparator 36, and generates both or one of a pulse ON trigger signal and a pulse OFF trigger signal during a mode set by the CPU 21, and outputs the generated signals to the down counter 37.

The pulse ON trigger signal transferred from the switch circuit 38 acts for changing the output level of the down counter 37 to an active level (H level through the embodiment), and the pulse OFF trigger signal transferred from the switch circuit 38 acts for changing the output level of the down counter 37 to an inactive level (L level through the first embodiment). Through the first embodiment, the above signals, the angle comparison matching signal, the time comparison matching signal, the pulse ON trigger signal, the pulse OFF trigger signal take H level as the active level.

The CPU 31 sets an optional value indicating an optional time length as data into the down counter 37 in advance. When receiving the pulse ON trigger signal transferred from the switch circuit 38, the down counter 37 switches Low level of its output signal to H level and initiates down counting operation from the pre-set value. When the counted value reaches zero, or when receiving the pulse OFF trigger signal transferred from the switch circuit 38, the down counter 37 switches H level of its output signal to L level. The configuration of the down counter 37 will be described in detail later.

On the contrary, the angle counter 31 is a counter that performs the counting operation with a smaller resolution than the angle by which an effective edge is generated in the crank signal. The counted value of the angle counter 31 indicates the crank angle with this angle resolution. That is, the microcomputer 13 has a count controller (not shown) configured to control the counting operation of the angle counter 31. The count controller (not shown) generates a multiplication clock signal (, more specifically, a period of which is obtained by dividing a period of the crank signal by a multiplication number) based on a crank signal. The angle counter 31 performs the counting operation repeatedly based on the multiplication clock signals.

The configuration and operation of such a count controller are well known, the explanation for them is omitted here.

The time counter 34 is a free run counter to count up every receiving an internal clock.

The comparator 33 has a latch circuit (not shown) which continuously outputs the angle comparison matching signal until the CPU 21 resets the latch circuit after the output of the angle comparison matching signal from the comparator 33. The comparator 36 has such a function.

Next, a description will now be given of the configuration and operation of the switch circuit 38 with reference to FIG. 3A and FIG. 3B.

FIG. 3A shows a setting table indicating the operation of the switch circuit 38 incorporated in the timer module 29 shown in FIG. 2.

The set value in the setting table shown in FIG. 3A is a set value (hereinafter, referred to as "mode set value") of the operation mode set by the CPU 21. FIG. 3B is a block diagram showing a configuration of the switch circuit 38 incorporated in the timer module 29 shown in FIG. 2.

As shown in FIG. 3A, the switch circuit 38 is set into an operation mode when receiving the mode set value transferred from the CPU 21. The operation mode is one of the values of 0 to 5. The switch circuit 38 generates both or one of the pulse ON trigger signal and the pulse OFF trigger signal based on the received angle comparison matching signal and the time comparison matching signal under the condition of the set operation mode.

That is, when the mode set value is 1, the switch circuit 38 does not output the pulse ON trigger signal, and outputs the time comparison matching signal from the comparator 36 as the pulse OFF trigger signal.

Further, when the mode set value is 2, the switch circuit 38 does not output the pulse OFF trigger signal, and outputs the angle comparison matching signal from the comparator 33 as the pulse ON trigger signal.

Still further, when the mode set value is 3, the switch circuit 38 outputs the angle comparison matching signal as the pulse ON trigger signal, and outputs the time comparison matching signal as the pulse OFF trigger signal.

Moreover, when the mode set value is 4, the switch circuit 38 does not output the pulse OFF trigger signal, and performs a logical AND operation between the angle comparison matching signal and the time comparison matching signal, and then outputs the logical operation result as the pulse ON trigger signal.

Still further, when the mode set value is 5, the switch circuit 38 does not output the pulse ON trigger signal, and performs a logical AND operation between the angle comparison matching signal and the time comparison matching signal, and then outputs the logical operation result as the pulse OFF trigger signal.

Finally, when the mode set value is 0, the switch circuit 38 does not output both the pulse ON trigger signal and the pulse OFF trigger signal.

In order to realize such a function described above, the switch circuit 38 has a register 41, an AND circuit 42, OR circuits 43 and 44, switch circuits 45 to 48, and a decode circuit 49. The CPU 21 writes the mode set value to the register 41. The AND circuit performs the logical AND operation between the angle comparison matching signal and the time comparison matching signal and outputs the operation result as the logical AND signal. The OR circuit 43 outputs the pulse ON trigger signal. The OR circuit 44 outputs the pulse OFF trigger signal. When the switch circuit 45 is turned ON, the angle comparison matching signal is provided to one input terminal of the OR circuit 43. When the switch circuit 46 is turned ON, the output of the AND circuit 42 is provided to another input terminal of the OR circuit 43. When the switch circuit 47 is turned ON, the time comparison matching signal is provided to one input terminal of the OR circuit 44. When the switch circuit 48 is turned ON, the output of the AND circuit 42 is provided to another input terminal of the OR circuit 44. The decode circuit 49 controls ON/OFF operation of those switch circuits 45 to 48 according to the mode set value stored in the register 41.

When the mode set value is 0, the decode circuit 49 controls so that all of the switch circuits 45 to 48 are turned OFF.

When the mode set value is 1, the decode circuit 49 controls so that only the switch circuit 47 is turned ON.

When the mode set value is 2, the decode circuit 49 controls so that only the switch circuit 45 is turned ON.

When the mode set value is 3, the decode circuit 49 controls so that only the switch circuits 45 and 47 are turned ON.

When the mode set value is 4, the decode circuit 49 controls so that only the switch circuit 46 is turned ON.

When the mode set value is 5, the decode circuit 49 controls so that only the switch circuit 48 is turned ON.

Both the input terminal of the OR circuits 43 and 44 are pull downed, namely, grounded through resistances (not shown). Because the input terminals of the OR circuits 43 and 44 are connected to the switch circuits 45 to 48, when all of the switch circuits 45 to 48 are turned OFF, each input terminal of the OR circuits 43 and 44 inputs the signal of Low level.

Figure 4:
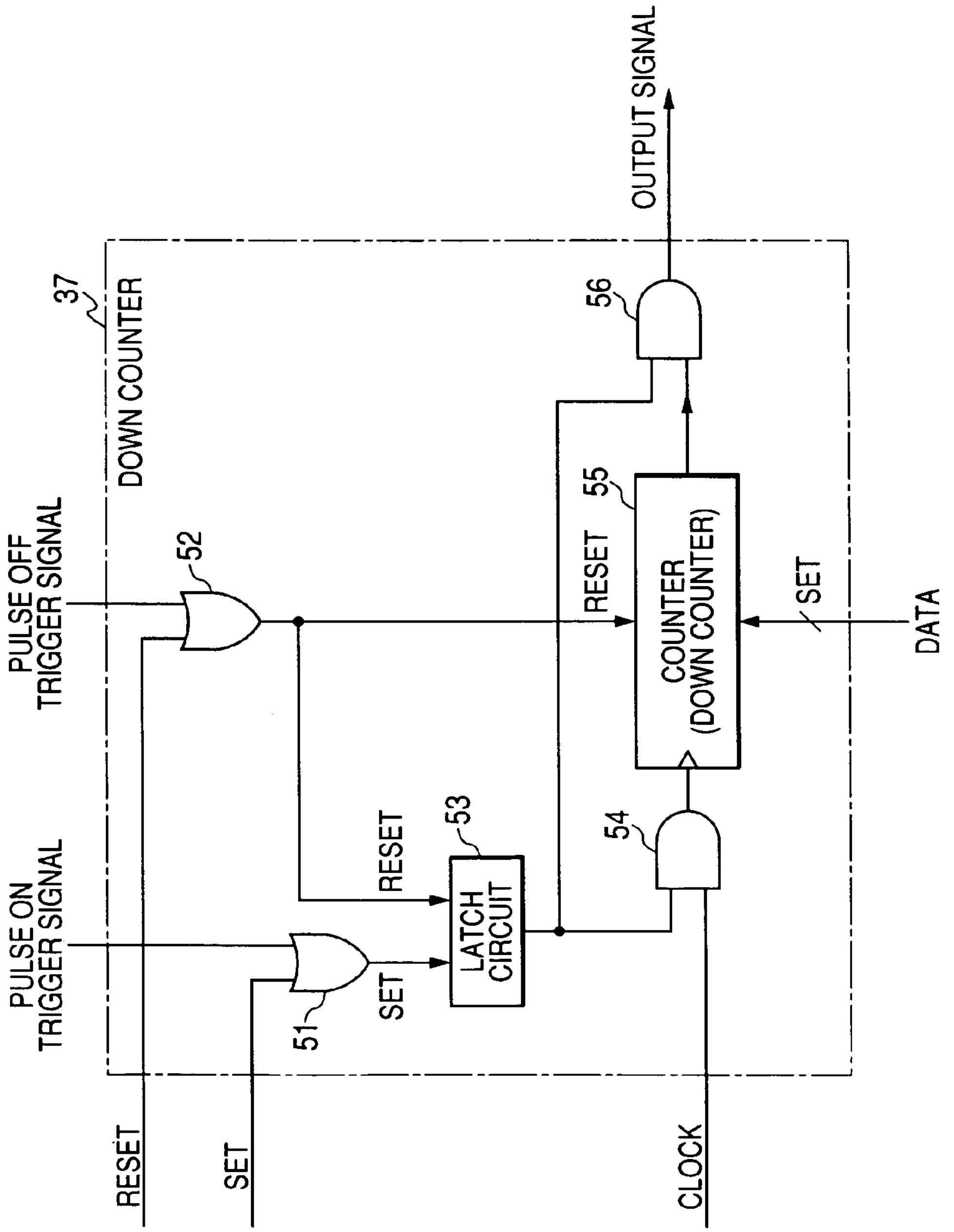
FIG. 4 is a block diagram showing a configuration of a down counter incorporated in the timer module shown in FIG. 2.

FIG. 4 is a block diagram showing a configuration of the down counter 37 incorporated in the timer module 29 shown in FIG. 2.

As shown in FIG. 4, the down counter 37 has OR circuits 51 and 52, a latch circuit 53, AND circuits 54 and 56, and a counter 55.

The OR circuit 51 inputs the pulse ON trigger signal transferred from the switch circuit 38 and the set signal transferred from the CPU 21. The OR circuit 52 inputs the pulse OFF trigger signal transferred from the switch circuit 38 and the reset signal transferred from the CPU 21. The latch circuit 53 has a high-active set terminal to which the output signal from the OR circuit 51 is supplied and a high-active reset terminal to which the output signal from the OR circuit 52 is supplied. The AND circuit 54 inputs the output from the latch circuit 53 and the internal clock in the microcomputer 13. The CPU 21 can set an optional data item indicating an optional time length to the counter 55 in advance. The counter 55 performs the counting down operation based on the clock signal provided from the AND counter 54 and outputs a High level signal until the counted values reaches zero. The AND circuit 56 performs logical AND between the output from the counter 55 and the output of the latch circuit 53, and outputs the operation result as the output of the down counter 37.

When the output signal of the OR circuit 52 becomes High level, the counted value of the counter 55 is reset to zero.

In the down counter 37 having such a configuration, when the down counter 37 receives the pulse ON trigger signal of High level transferred from the switch circuit 38 under the condition where the value indicating an optional time length is set in advance to the counter 55, the latch circuit 53 becomes active and thereby outputs the signal of High level, and the AND circuit 56 thereby outputs the output signal of High level. At a same time, the counter 55 initiates the down counting when receiving the clock signal from the AND circuit 54.

When the count value of the counter 55 reaches zero, or when the switch circuit 38 outputs the pulse OFF trigger signal of High level and the OR circuits 52 resets the latch circuit 43 and the counter 55, the AND circuit 56 outputs the output signal of Low level.

The latch circuit 53 is forcedly set to the set state by transferring the set signal from the CPU 21 to the OR circuit 51.

Both the latch circuit 53 and the counter 55 are forcedly reset on transferring the reset signal from the CPU 21 to the OR circuit 52.

A description will now be given of the process to output the injection pulse signal using the timer module 29 with reference to FIGS. 5A and 5B, FIG. 6, and FIG. 7. In the following case, the down counter 37 outputs the output signal as the injection pulse signal.

Figure 5A:
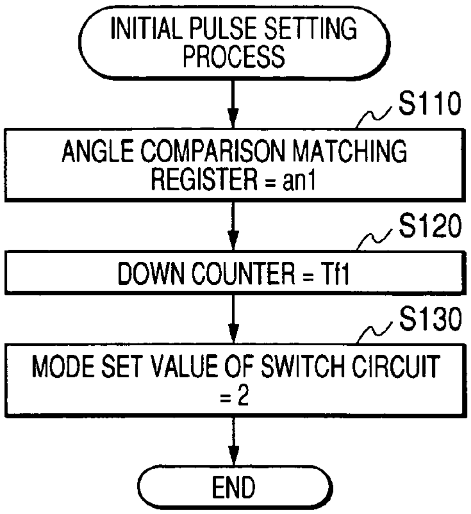
FIG. 5A is a flow chart showing a primary injection pulse setting process of outputting a primary injection pulse signal performed by the CPU according to the first embodiment.
Figure 5B:
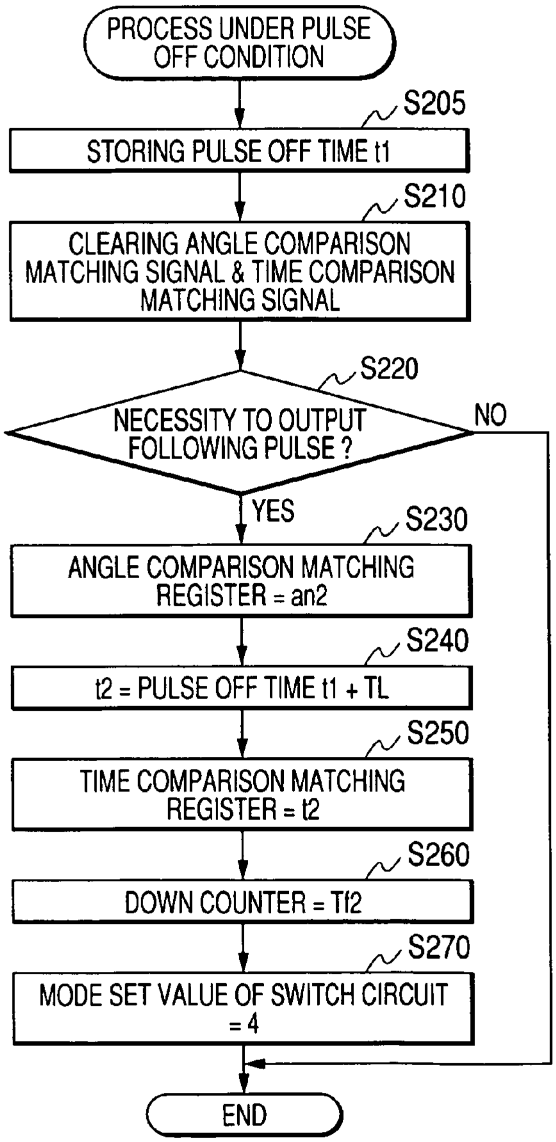
FIG. 5B is a flow chart showing a process during an injection pulse-off timing in which the CPU outputs a secondary injection pulse signal according to the first embodiment.
Figure 6:
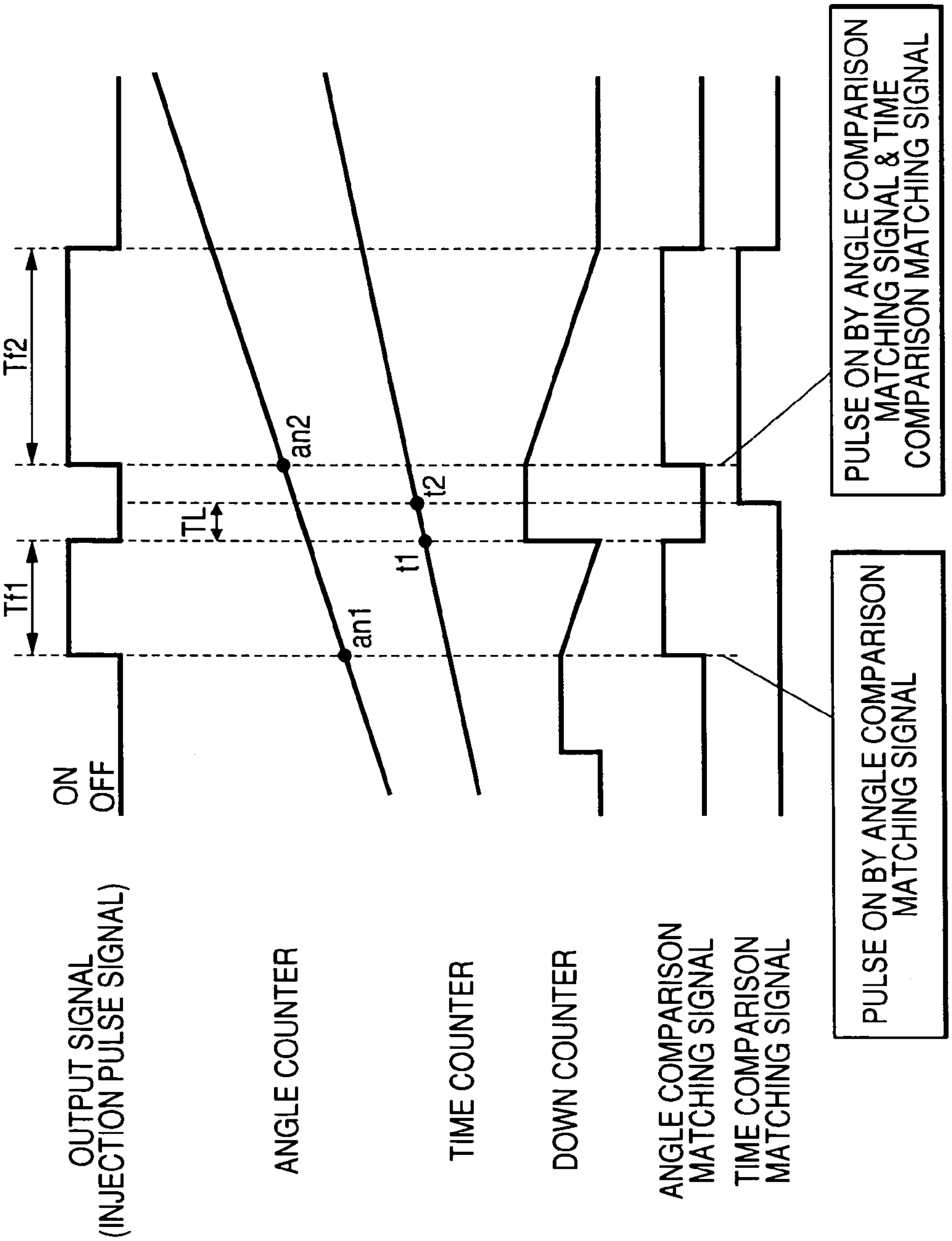
FIG. 6 is a timing chart showing the primary pulse setting process shown in FIG. 5A.
Figure 7:
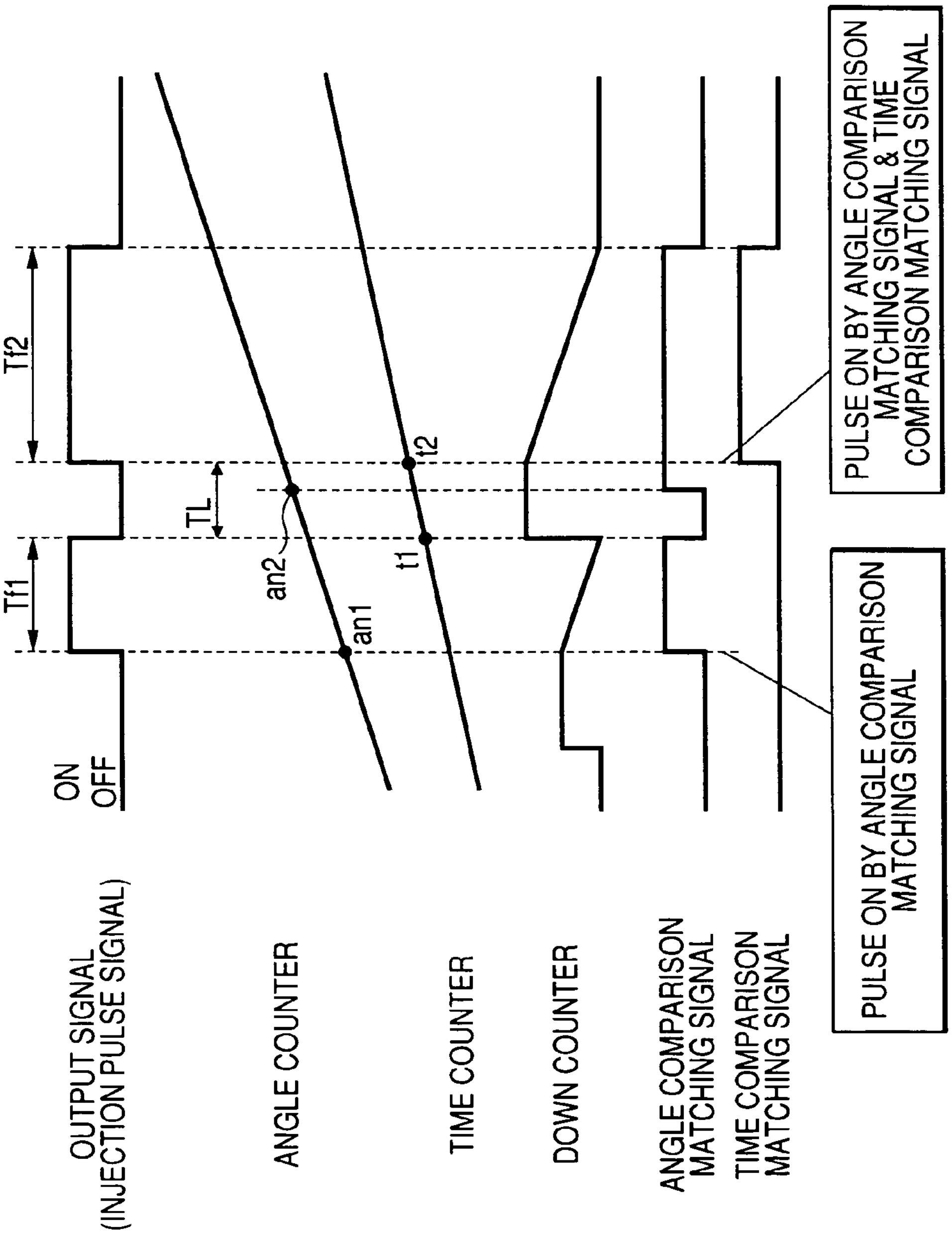
FIG. 7 is a timing chart showing the primary pulse setting process shown in FIG. 5A.

FIG. 5A is a flow chart showing a primary injection pulse setting process of outputting a primary injection pulse signal performed by the CPU 21 according to the first embodiment. FIG. 5B is a flow chart showing a process during an injection pulse OFF timing in which the CPU 21 outputs a secondary injection pulse signal according to the first embodiment. FIG. 6 is a timing chart showing the primary pulse setting process shown in FIG. 5A. FIG. 7 is a timing chart showing the primary pulse setting process shown in FIG. 5A.

The ECU 11 according to the first embodiment performs a split injection in which the fuel injection to each cylinder of the engine is divided into plural injections. In order to realize the split injection, the injection pulse signal has High level during a primary injection time period "Tf1" counted from the primary injection start angle "an1" of the crank angle of the crankshaft. After this, the injection pulse signal has High level during a secondary injection time period "Tf2" counted from the secondary injection start angle "an2" of the crank angle of the crankshaft. Further, the split injection process must have the time limitation to keep the time interval between the primary injection pulse signal and the secondary injection pulse signal. That is, even if the crank angle of the crankshaft takes the secondary injection start angle "an2", the output of the injection pulse signal of Low level must be kept until the regular time length TL has been elapsed counted from the completion time of the primary fuel injection process (, namely, from the timing at which the primary injection pulse signal is switched to Low level, see FIG. 6).

The CPU 21 performs another control process (not shown) of detecting the operation state of the engine 1 based on detection signals transferred from sensors of various types, and the CPU 21 calculates the primary and secondary injection start angles "an1" and "an2", and the fuel injection timings "Tf1" and "Tf2" based on the detection results of those sensors of various types.

FIG. 5A shows the flow chart of the primary pulse setting process to be executed by the CPU 21 in order to output the primary injection pulse signal.

The primary pulse setting process is performed at an optional timing before the crank angle of the crankshaft reaches the primary injection start angle "an1". Before the initiation of the primary pulse setting process, the CPU 21 resets the latch circuits in the comparators 33 and 36 (which output the angle comparison matching signal and the time comparison matching signal), and the latch circuit 53 in the down counter 37.

As shown in FIG. 5A, when the CPU 21 initiates the primary pulse setting process, the primary injection start angle "an1" is set into the angle comparison matching register 32 (step S110). Following, the value corresponding to the primary fuel injection time length "Tf1" is set into the down counter 37 (more specifically, into the counter 55 forming the down counter 37) in step S120. The value corresponding to the fuel injection time length "Tf1" is obtained by dividing the fuel injection time length "Tf1" by one period of the clock in the down counter 37.

At step S130, the value 2 is written into the register 41 of the switch circuit 38. After this, the primary pulse setting process is completed.

As shown in FIG. 6, when the value of the angle counter 31 reaches the primary injection start angle "an1" and the comparator 33 outputs the angle comparison matching signal (namely, when the angle comparison matching signal becomes High level), the switch circuit 38 outputs the pulse ON trigger signal of High level, and the down counter 37 outputs the injection pulse signal of High level. At the same time, the down counter 37 initiates the counting down of the counter 55 therein. After this, when the count value of the counter 55 reaches zero after the primary fuel injection time length "Tf1" is elapsed. The down counter 37 outputs the injection pulse signal of Low level. The primary injection pulse signal is switched by using the above manner.

FIG. 5B shows the pulse OFF process of outputting the secondary injection pulse signal from the CPU 21. The pulse OFF process is performed when the injection pulse signal is switched from High level to Low level.

As shown in FIG. 5B, when starting the pulse OFF process, the CPU 21 reads the value stored in the time counter 34 (at step S205) and stores therein as the timing "t1" (hereinafter, referred to as "pulse OFF timing") at which the injection pulse signal is switched from High level to Low level.

At step S210, the latch circuits in the comparators 33 and 36 are reset in order to clear the angle comparison matching signal and the time comparison matching signal for the primary fuel injection process. Further, the latch circuit 53 in the down counter 37 is reset when the down counter 37 receives the reset signal.

At step S220, it is judged whether or not it is necessary to output the following injection pulse signal. When the judgment result indicates not necessity to output the following injection pulse signal (, namely, when the fuel pulse signal switched to Low level is the secondary injection pulse signal), the pulse OFF process is completed.

In step S220, when the judgment result indicates the necessity to output the following injection pulse signal (namely, when the fuel pulse signal switched to Low level is the primary injection pulse signal), the operation process goes to step S230 in which the secondary injection start angle "an2" is set to the angle comparison matching register 32.

At step S240, the CPU 21 adds the pulse OFF time "t1" stored therein at step S205 and the counted value corresponding to the regular time length "TL" to be stored in the time counter 34 (, more specifically, which is the value obtained by dividing the regular time length "TL" by the time of one cycle of the clock signal used in the time counter 34), and outputs the calculated value as the time "t2" that is the elapsed time of the regular time length "TL" counted from the pulse OFF time "t1". That is, the predicted value is calculated as the time "t2". The predicted value is the value stored in the time counter 34 when the regular time length "TL" has been elapsed from the pulse OFF time "t1".

Next, at step S250, the time "t2" calculated in step S240 is set into the time comparison matching register 35. At step S260, the value corresponding to the secondary fuel injection time "Tf2" is set to the down counter 37 (, more specifically, set to the counter forming the down counter 37).

The value corresponding to the fuel injection time "Tf2" is the value obtained by dividing the fuel injection time "Tf2" by one period of the clock signal used in the down counter 37.

At step S270, the value "4" is written into the register 41 in the switch circuit 38, and the pulse OFF process is thereby completed.

In the pulse OFF process described above, if the crank angle reaches the secondary injection start angle "an2" after the regular time length "TL" is elapsed from the pulse OFF time "t1" of the primary injection pulse signal, as shown in FIG. 6, the comparator 36 outputs the time comparison matching signal of High level because the value of the time counter 34 reaches the time "t2" set in the time comparison matching register 35 before the value stored in the angle counter 31 reaches the secondary injection start angle "an2" set in the angle comparison matching register 32. In this state, because the mode set value set in the switch circuit 38 is 4, the switch circuit 38 outputs the pulse ON trigger signal of High level and the down counter 37 outputs the secondary injection pulse signal of High level from Low level when the value in the angle counter 31 reaches the secondary injection start angle "an2" and when the comparator 33 outputs the angle comparison matching signal of High level. At the same time, the counter 55 in the down counter 35 initiates the counting down process, and after this, the down counter 37 outputs the secondary injection pulse signal of Low level from High level when the secondary fuel injection time "Tf2" is elapsed and the count value of the counter 55 reaches zero.

On the other hand, if the rotation speed of the crankshaft increases, and when the crank angle thereby reaches the secondary injection start angle "an2" before the regular time length "TL" counted from the pulse OFF time "t1" of the primary injection pulse signal is elapsed, as shown in FIG. 7, the comparator 33 outputs the angle comparison matching signal of High level because the value in the angle counter 31 reaches the secondary injection start angle "an2" set in the angle comparison matching register 32 before the value in the time counter 34 reaches the time "t2" set in the time comparison matching register 35.

After this, because the mode set value set in the switch circuit 38 is 4, the switch circuit 38 outputs the pulse ON trigger signal of High level and the down counter 37 outputs the secondary injection pulse signal of High level from Low level when the value in the time counter 34 reaches the time "t2" set in the time comparison matching register 35 and when the comparator 36 outputs the time comparison matching signal of High level (that is, at the elapsed time of the regular time length "TL" counted from the pulse OFF time "t1" from Low level).

At the same time, the counter 55 in the down counter 37 initiates the counting down process. After this, the down counter 37 outputs the secondary injection pulse signal of Low level from High level when the count value in the counter 55 reaches zero after the secondary fuel injection time "Tf2" is elapsed.

Thus, when the mode set value of 4 is set to the switch circuit 38 in the timer module 29 in the ECU 11, the down counter 37 outputs the output signal of High level as active level switched from Low level as non-active level at the timing in which the comparator 33 outputs the angle comparison matching signal and the comparator 36 outputs the time comparison matching signal.

It is thereby possible to certainly satisfy the time limitation function regarding the injection pulse signal under the split injection process without any influence of rotation of the crankshaft by setting the values to the angle comparison matching register 32 and the time comparison matching register 35 in steps S230 to S250 shown in FIG. 5B, where the time limitation function is following conditions (a1) and (a2):

(a1) The time interval between the primary injection pulse signal and the secondary injection pulse signal takes more than the regular time length "TL" under the time limitation regarding the injection pulse signal in the split injection process; and (a2) A following pulse signal is not switched to High level until the regular time length "TL" counted from the completion time of the primary fuel injection has been elapsed even if the crank angle reaches the secondary injection start angle "an2".

A description will now be given of the process to output the ignition pulse signal using the timer module 29 with reference to the flow charts shown in FIG. 8A and FIG. 8B and the timing chart shown in FIG. 9. In this case, the down counter 37 outputs the output signal as the ignition pulse signal.

At first, as precondition, the CPU 21 detects the operation state of the engine 1 of the vehicle based on the signals transferred from the various sensors in another control process (not shown), and calculates both the pulse OFF angle "an21" and the pulse ON time "Ton" as control parameters for the ignition pulse signal based on the detection result. The CPU 21 further calculates the pulse ON angle "an11" based on both the control parameters "an12" and "Ton".

Figure 9:
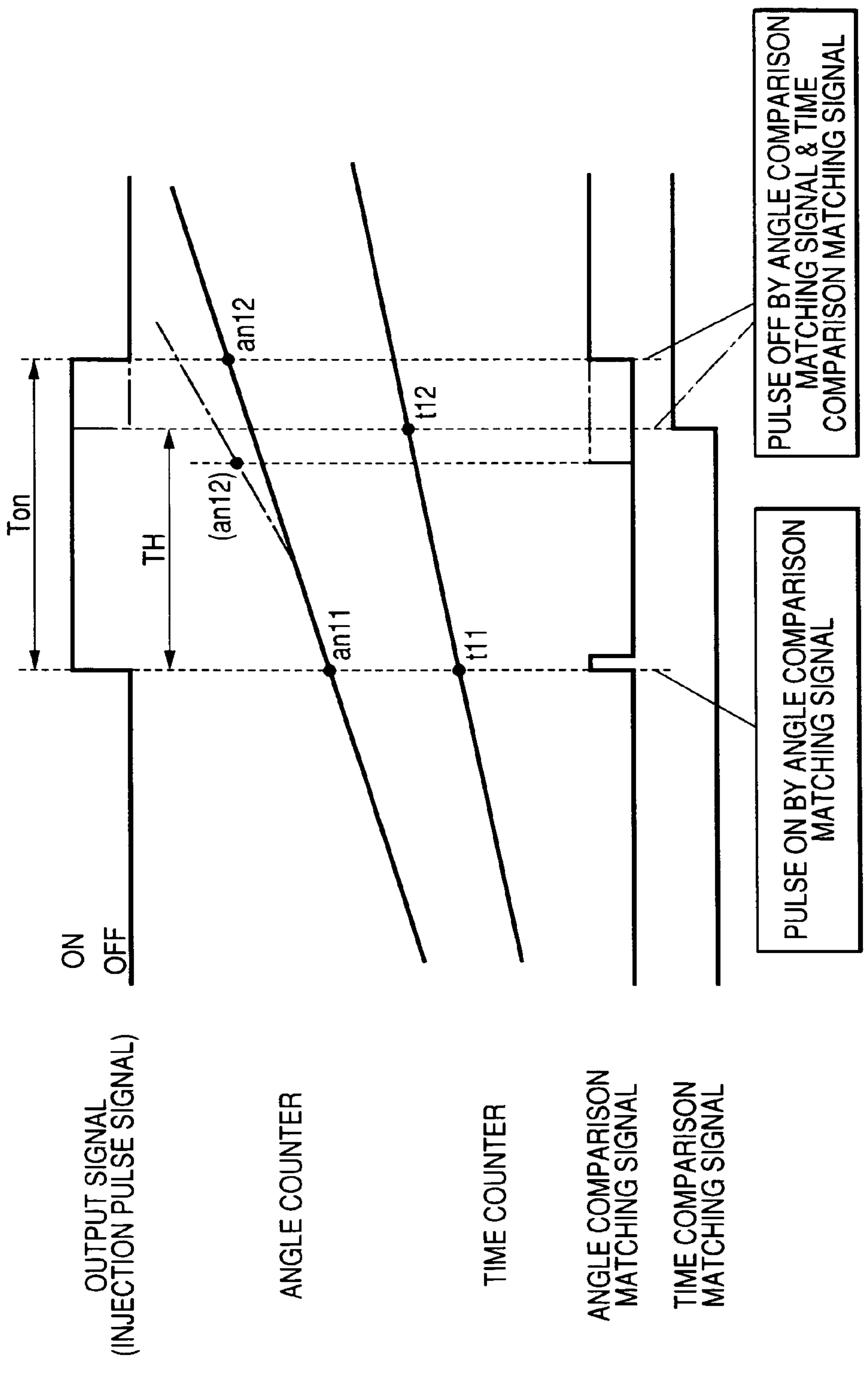
FIG. 9 is a timing chart showing the ignition pulse ON setting process shown in FIG. 8A and FIG. 8B.

As shown in FIG. 9, the pulse OFF angle "an12" is a crank angle at which the ignition pulse signal of High level is switched to Low level. In other words, it is the crank angle at which the power supply to the igniter 3 is terminated. The pulse ON time "Ton" is the time period to keep the ignition pulse signal of H level. In other words, it is the time period to continuously supply the electric power to the igniter 3. The pulse ON angle "an11" is the crank angle at which the ignition pulse signal of Low level is switched to High level. In other words, it is the crank angle to initiate the power supply to the igniter 3.

The pulse ON angle "an11" is calculated based on the pulse OFF angle "an12", the pulse ON time "Ton", and the rotation speed of the crankshaft detected at this timing.

In a concrete example, the CPU 21 calculates the rotation angle "CAon" of the crankshaft during the pulse ON time "Ton" based on the rotation speed of the crankshaft, and calculates the pulse ON angle "an11" by subtracting the calculated angle "CAon" from the pulse OFF angle "an12".

That is, because it is important to know the timing of when to switch to a High level of ignition pulse signal to Low level, the pulse ON angle "an11" is calculated based on the pulse OFF angle "an12" which is used to determine this OFF timing.

In a case where the rotation speed of the crankshaft increases after the ignition pulse signal of Low level is switched to High level after the crank angle reaches the pulse ON angle "an11", because the actual time from the pulse ON angle "an11" to the pulse OFF angle "an12" (that is, the time at which the ignition pulse signal is actually switched to High level) is shorter than the calculated pulse ON time "Ton", there is a possibility not to ignite sparking plugs.

In order to avoid this phenomenon, during the ignition control for the engine 1, the ignition pulse signal of High level is kept (in other words, the output of the ignition pulse signal is not terminated) until the regular time length "TH" counted from the timing of the pulse ON angle "an11" (that is, from the timing at which the ignition pulse signal is switched to High level) has been elapsed.

Figure 8A:
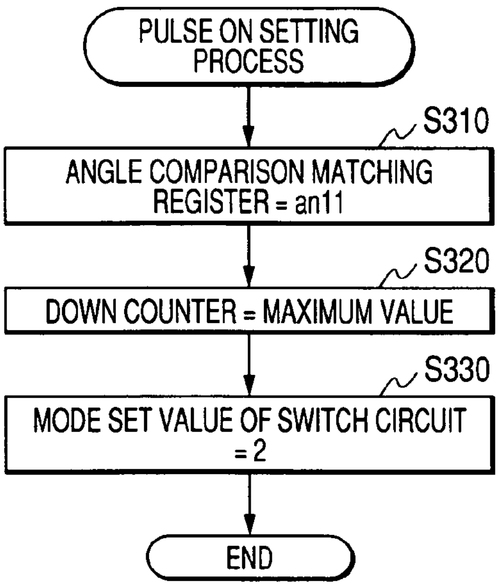
FIG. 8A is a flow chart showing an ignition pulse ON setting process of switching Low level of an ignition pulse signal to High level by the CPU according to the first embodiment.

FIG. 8A is a flow chart showing the pulse ON setting process in which the CPU 21 switches Low level of the ignition pulse signal to High level. The pulse ON setting process is executed at an optional timing before the crank angle reaches the pulse ON angle "an11". Before the execution of the pulse ON setting process, the CPU 21 resets the latch circuits (output the angle comparison matching signal and the time comparison matching signal) incorporated in the comparators 33 and 36 and the latch circuit incorporated in the down counter 53.

As shown in FIG. 8A, the CPU 21 initiates the pulse ON setting process, and sets the pulse ON angle "an11" to the angle comparison matching register 32 at step S310. The CPU 21 sets the available maximum count value to the down counter 37 (more specifically, to the counter 55 forming the down counter 37.

The time from the maximum value to zero by the counter 55 is adequately longer than the pulse ON time "Ton" calculated by the CPU 21. The reason for setting the maximum value to the down counter 37 at step S320 is that the output control for the ignition pulse signal to switch High level thereof to Low level does not use the counting down function of the down counter 37.

Next, at step S330, CPU 21 sets the value of 2 as the mode set value to the register 41 in the switch circuit 38, and the pulse ON setting process is then completed.

After the completion of the pulse ON setting process described above, when the angle counter 31 reaches the pulse ON angle "an11" and the comparator 33 outputs the angle comparison matching signal (that is, switches Low level of the angle comparison matching signal to High level), as shown in FIG. 9, the switch circuit 38 outputs the pulse ON trigger signal of High level (that is switched from Low level) and the down counter 37 outputs the ignition pulse signal of High level (that is switched from Low level).

Figure 8B:
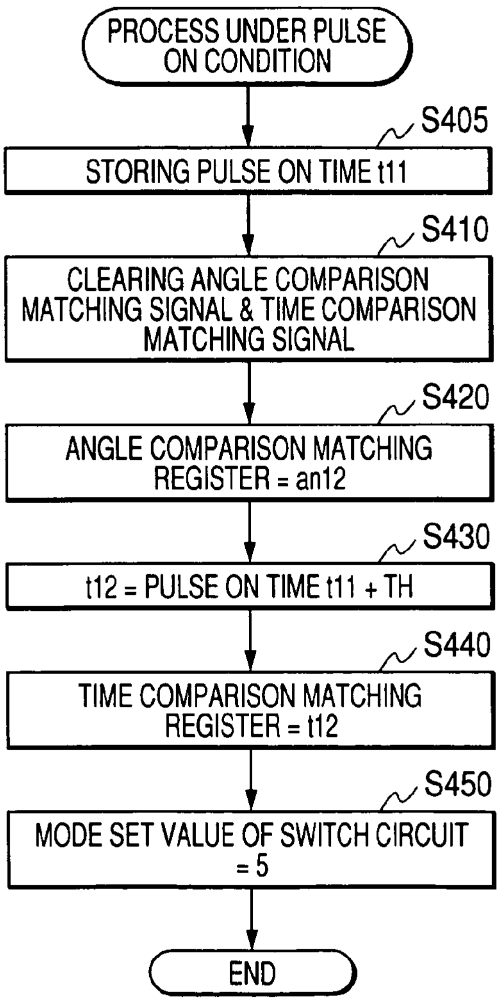
FIG. 8B is a flow chart showing a process under pulse ON condition performed by the CPU when the ignition pulse signal is switched from High level to Low level according to the first embodiment.

Next, as shown in FIG. 8B, when the CPU 21 initiates the process under pulse ON condition, the CPU 21 reads the current value stored in the time counter 24 at step S405, and stores it as the time "t11" at which the ignition pulse signal is switched from Low level to High level (hereinafter, this timing is referred to as "pulse ON time").

At step S410, the CPU 21 resets the latch circuits in the comparators 33 and 36 in order to clear the angle comparison matching signal and the time comparison matching signal.

Next, at step S420, the CPU 21 sets the pulse OFF angle "an12" to the angle comparison matching register 32.

Next, at step S430, the CPU 21 adds the count value during the regular time length "TH" counted by the time counter 34 to the pulse ON time "t11" stored in step S405 therein, where the count value during the regular time length "TH" is the value obtained by dividing the regular time length "TL" by the time period of one clock cycle used in the time counter 34. The CPU 21 outputs the added value described above as the time "t12" at which the regular time "TH" is elapsed counted from the pulse ON time "t11". That is, the CPU 21 calculates the time "t12" as a prediction value to be stored in the time counter 34 which is the elapsed time of the regular time length "TH" counted from the pulse ON time "t11".

At step S440, the CPU 21 sets the calculated time "t12" at step S430 to the time comparison matching register 35. At step S450, the CPU 21 writes the mode set value of 5 to the register 41 in the switch circuit 38. After those processes, the process under pulse ON condition is completed.

By performing such a process under the pulse ON condition shown in FIG. 8B, when the crank angle reaches the pulse OFF angle "an12" after the time "t12" as the elapsed time of the regular time length "TH" counted from the pulse ON time "t11", as shown by solid lines in FIG. 9, the comparator 36 outputs the time comparison matching signal of High level because the value stored in the time counter 34 reaches the time "t12" stored in the time comparison matching register 35 before the value stored in the angle counter 31 reaches the pulse OFF angle "an12" set in the angle comparison matching register 32.

After this, because the mode set value of 5 is set into the switch circuit 38, when the value in the angle counter 31 reaches the pulse OFF angle "an12" and when the angle comparison matching signal transferred from the comparator 33 becomes High level, the switch circuit 38 outputs the pulse OFF trigger signal of High level, and the down counter 37 outputs the ignition pulse signal of Low level.

On the contrary, when the rotation speed of the crankshaft increases, and when the crank angle reaches the pulse OFF angle "an12" before the time "t12" that is the elapsed time of the regular time length "TH" counted from the pulse ON time "t11", as shown by the alternate long and short dashed lines in FIG. 9, the comparator 33 outputs the angle comparison matching signal of High level because the value in the angle counter 31 reaches the pulse OFF angle "an12" set in the angle comparison matching register 32 before the value in the time counter 34 reaches the time "t12" set in the time comparison matching register 35.

Because the mode set value of 5 is set into the switch circuit 38, the switch circuit 38 outputs the pulse OFF trigger signal of Low level and the down counter 37 outputs the ignition pulse signal of Low level that is switched from High level when the value stored in the time counter 34 reaches the time "t12" stored in the time comparison matching register 35 and when the comparator 36 outputs the time comparison matching signal of High level (that is, when the regular time length "TH" counted from the pulse ON time "t11" has been elapsed).

As described above, when the mode set value of 5 is set into the switch circuit 38 in the timer module 29 incorporated in the ECU 11, the down counter 37 switches High level (as active level) of the ignition pulse signal to Low level (as inactive level) when both the comparators 33 and 36 output the comparison matching signals (the angle comparison matching signal and the time comparison matching signal).

Accordingly, it is possible to realize the following time limitation function without any influence of fluctuation of the rotation speed of the crankshaft of the engine 1 by setting the values into the angle comparison matching register 32 and the time comparison matching register 35 performed in steps S420 to S440 in FIG. 8B.

The time limitation function: Not to switch High level of the ignition pulse signal to Low level (namely, not to terminate the output of the ignition pulse signal) until the regular time length "TH" counted from the pulse ON angle "an11" has been elapsed.

As described above, according to the ECU 11 of the first embodiment of the present invention, it is possible to satisfy the time limitation conditions for the injection pulse signal for the split injection and the time limitation for the ignition pulse signal with reduced CPU load and without influence of fluctuation of the rotation speed of the crankshaft.

The relationship between the signal output unit of the first embodiment and the signal output unit defined in claims is as follows:

The timer module 29 corresponds to the signal output unit;

The angle comparison matching register 32 corresponds to the first register;

The comparator 33 corresponds to the first comparison circuit;

The time comparison matching register 36 corresponds to the second comparison circuit as defined in claims;

The processes in steps S230 to S250 shown in FIG. 5B or the processes in step S420 to S440 correspond to the processes performed by the register value setting process means as defined in claims, that is, in the processes for the injection pulse signal, the secondary injection start angle "an2" corresponds to the target angle, namely, the output-inversion angle, and the completion timing (at which the primary injection pulse signal is switched to Low level) of the primary fuel injection corresponds to the reference timing at the specified timing; and In the processes for the ignition pulse signal, the pulse OFF angle "an12" corresponds to the output-inversion angle, and the timing of the pulse ON angle "an11" (at which the ignition pulse signal is switched to High level) corresponds to the reference timing at the specified timing as defined in claims.

Further, the timer module 29 according to the first embodiment is capable of switching its output signal from Low level to High level at the timing when the CPU 21 transfers the set signal to the down counter 37 or the switch circuit 38 transfers the pulse ON trigger signal to the down counter 37 under the condition where the latch circuit 53 in the down counter 37 (see FIG. 4) has been reset and the count value in the counter 55 is not zero. After this, the timer module 29 can switch its output signal from High level to Low level at the timing when the CPU 21 transfers the reset signal to the down counter 37 or the switch circuit 38 transfers the pulse OFF trigger signal to the down counter 37 before the counted value in the counter 55 reaches zero.

Accordingly, for example, when the mode set value of zero is set into the switch circuit 38, the timer module 29 can switch its output signal from Low level to High level when the CPU 21 transfers the set signal to the down counter 37, and further, the timer module 29 can switch its output signal from High level to Low level when the CPU 21 transfers the reset signal to the down counter 37.

Still further, when the mode set value of 1 is set into the switch circuit 38, the timer module 29 can switch its output signal from Low level to High level when the CPU 21 transfers the set signal to the down counter 37, and further, the timer module 29 can switch its output signal from High level to Low level when the comparator 36 transfers the time comparison matching signal to the switch circuit 38.

Still further, when the mode set value of 2 is set into the switch circuit 38, the timer module 29 can switch its output signal from Low level to High level when the comparator 33 transfers the angle comparison matching signal to the switch circuit 38, and further, the timer module 29 can switch its output signal from High level to Low level when the CPU 21 transfers the reset signal to the down counter 37.

Moreover, when the mode set value of 3 is set into the switch circuit 38, the timer module 29 can switch its output signal from Low level to High level when the comparator 33 transfers the angle comparison matching signal to the switch circuit 38, and further, the timer module 29 can switch its output signal from High level to Low level when the comparator 36 transfers the time comparison matching signal to the switch circuit 38.

Second Embodiment

Next, a description will now be given of the timer module as the signal output unit and the ECU as the electronic control unit according to the second embodiment of the present invention.

Figure 10:
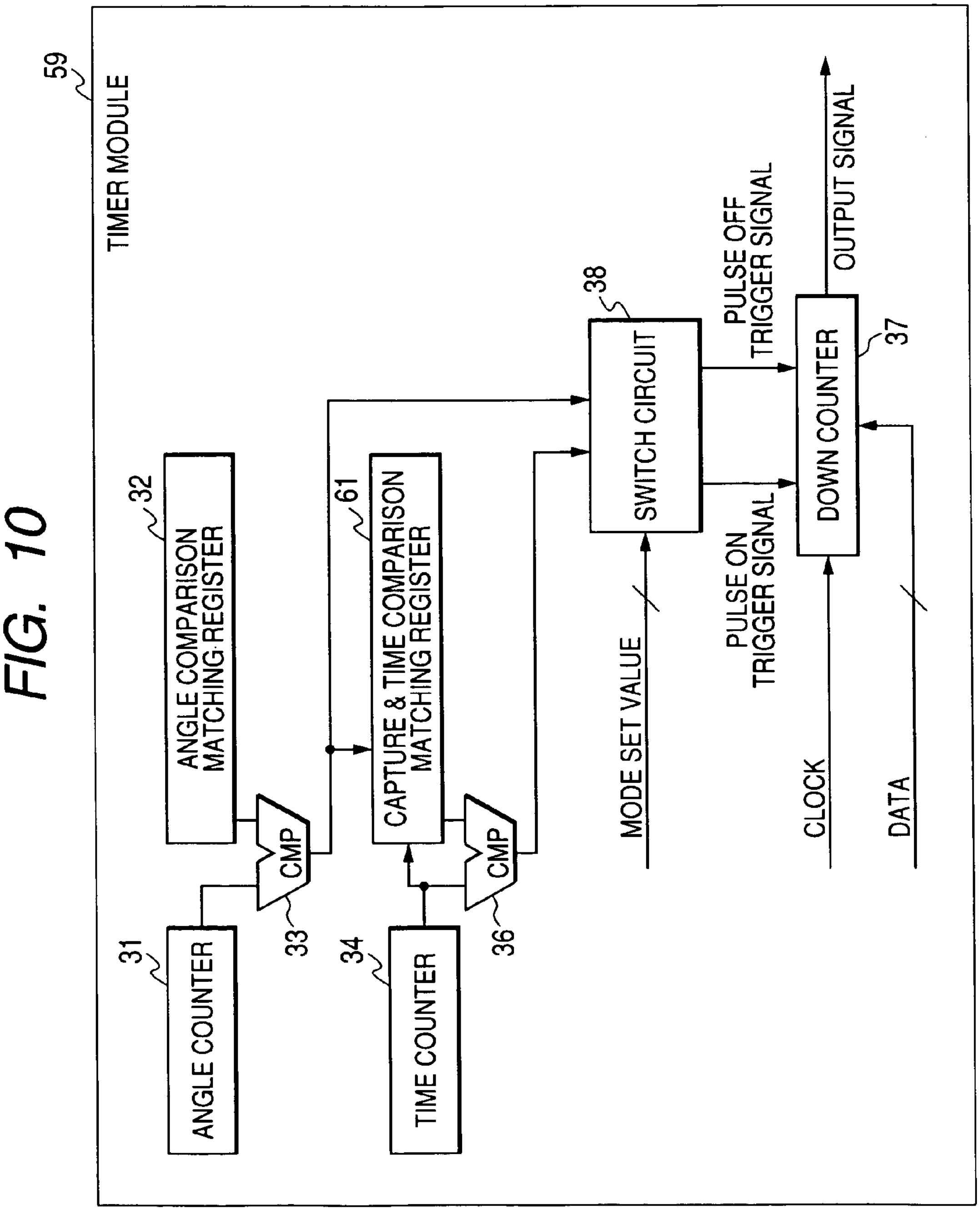
FIG. 10 is a block diagram showing another configuration of the timer module as a signal output unit incorporated in the CPU in the ECU according to a second embodiment of the present invention.

When compared with the configuration of the ECU according to the first embodiment, the ECU of the second embodiment has the timer module 59 shown in FIG. 10 instead of the timer module 29 of the first embodiment.

FIG. 10 is a block diagram showing a configuration of the timer module 59 incorporated in the CPU in the ECU according to the second embodiment of the present invention.

When compared with the timer module 29 of the first embodiment, the timer module 59 of the second embodiment has a capture and time comparison matching register 61 instead of the time comparison matching register 35 incorporated in the timer module 29 of the first embodiment.

The capture and time comparison matching register 61 is a register capable of performing two operation modes. In the first operation mode, similar to the function of the time comparison matching register 35 of the first embodiment, the capture and time comparison matching register 61 acts as the time comparison matching register in the timer module 29 of the first embodiment, the value stored therein is compared with the value stored in the time counter 34. In the second operation mode, the capture and time comparison matching register 61 acts as a capture register capable of capturing (that is, capable of retrieving and then storing therein) the value stored in the time counter 34 when the comparator 33 outputs the angle comparison matching signal to the register 61 and the switch circuit 38.

Figure 11A:
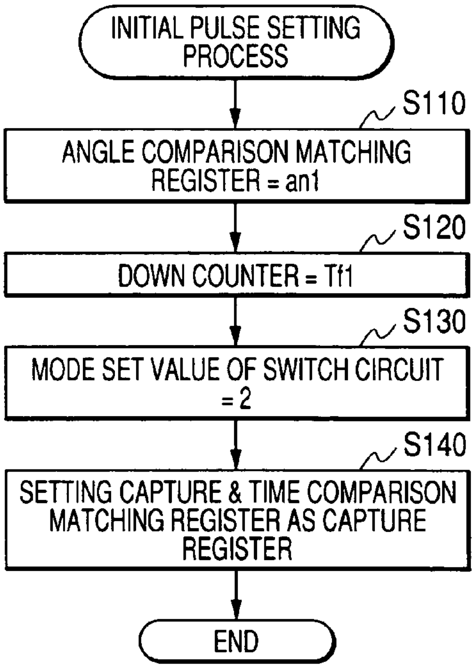
FIG. 11A is a flow chart showing a primary injection pulse setting process of outputting a primary injection pulse signal performed by the CPU according to a second embodiment.
Figure 11B:
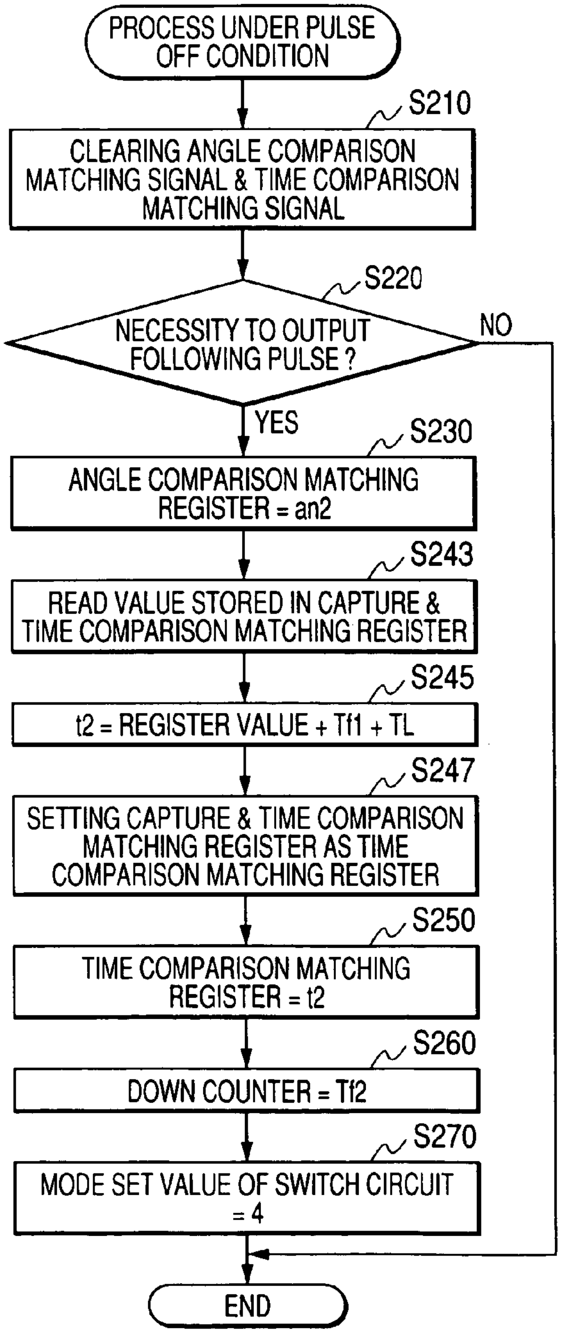
FIG. 11B is a flow chart showing a process during an injection pulse OFF timing in which the CPU outputs a secondary injection pulse signal according to the second embodiment.
Figure 12A:
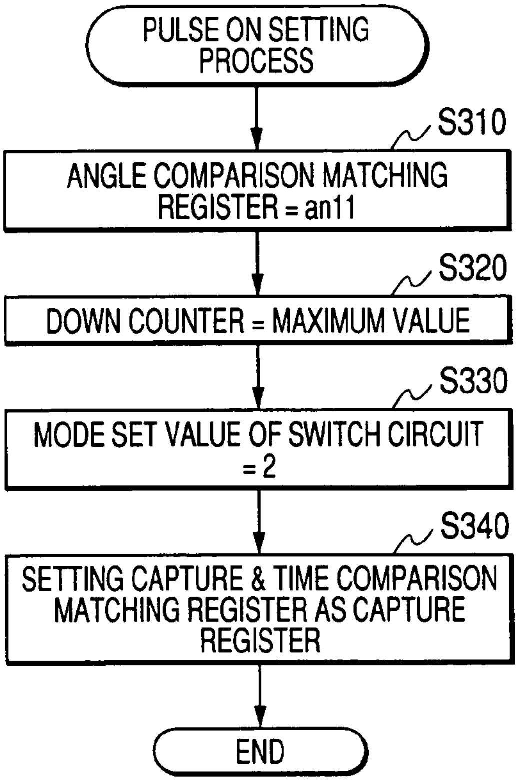
FIG. 12A is a flow chart showing an ignition pulse ON setting process of switching Low level of an ignition pulse signal to High level by the CPU according to the second embodiment.
Figure 12B:
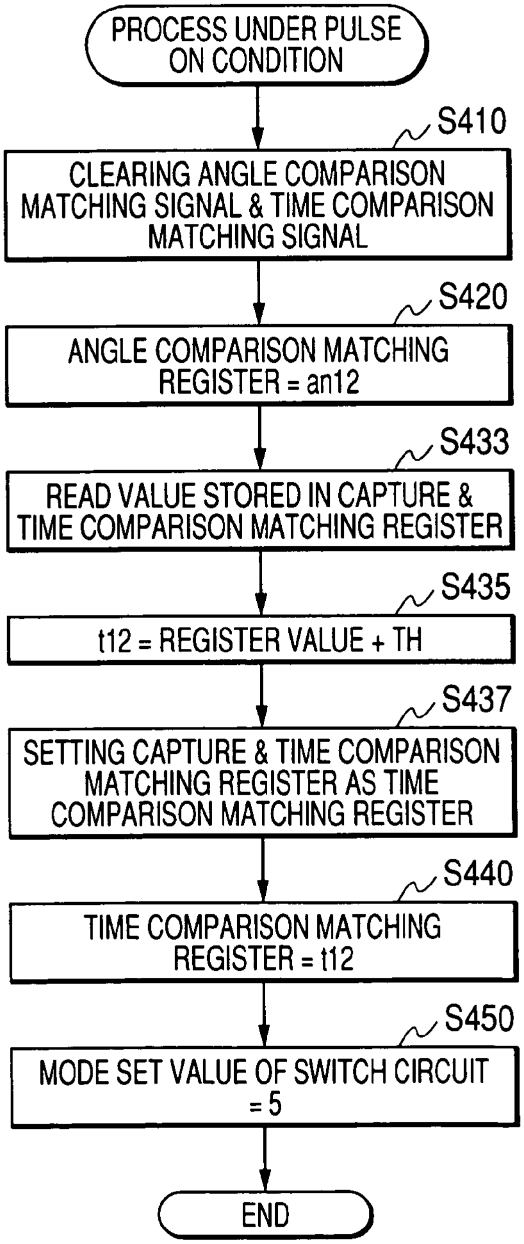
FIG. 12B is a flow chart showing the process under ignition pulse ON condition performed by the CPU when the ignition pulse signal is switched from High level to Low level according to the second embodiment.
Figure 13A:
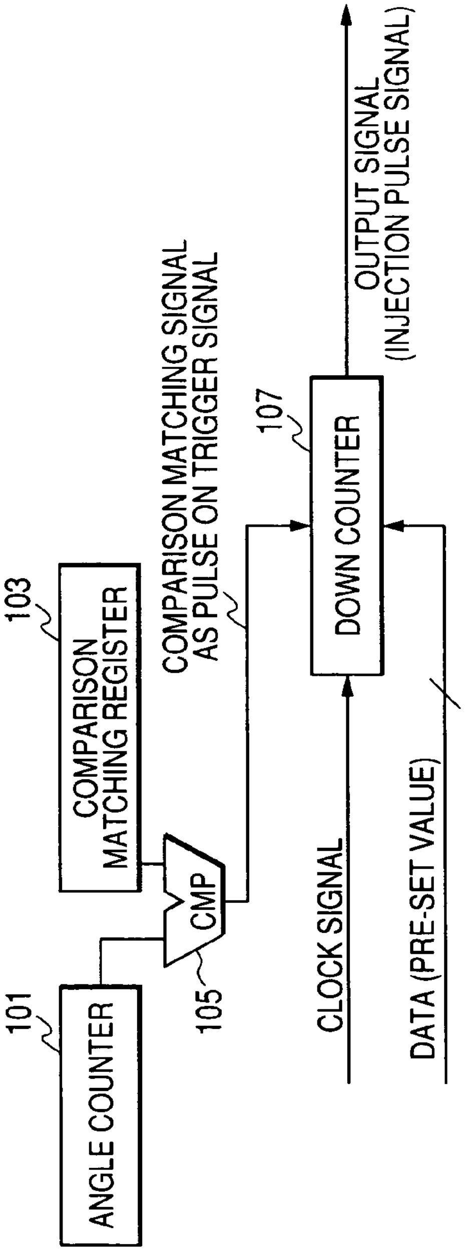
FIG. 13A (RELATED ART)
FIG. 13A shows a configuration of a block diagram of a circuit to output an injection pulse signal.
Figure 13B:
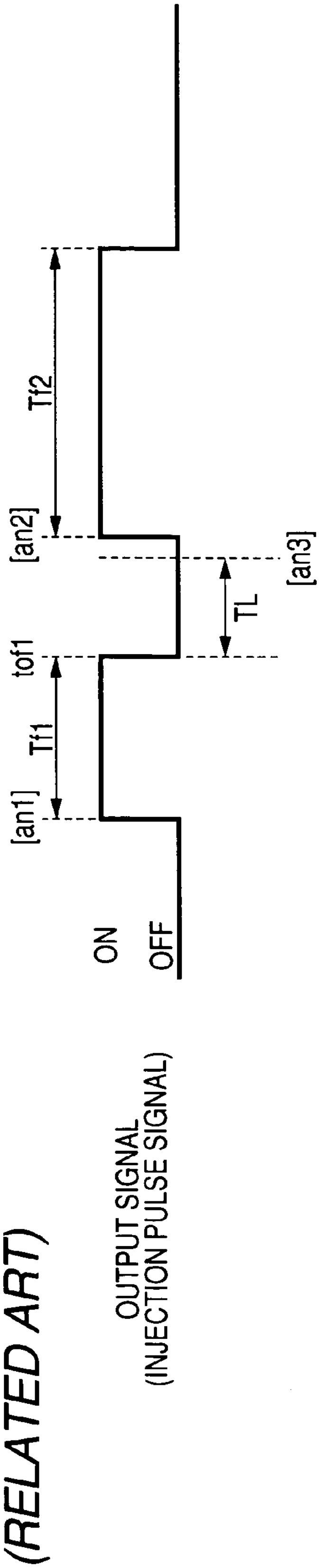
FIG. 13B (RELATED ART)
FIG. 13B is a timing chart showing the injection pulse signal in the circuit shown in FIG. 13A.

Further, when compared with the ECU 11 of the first embodiment, the CPU 21 in the ECU of the second embodiment performs the process shown in FIG. 11A and FIG. 11B, instead of the process shown in FIG. 5A and FIG. 5B of the first embodiment, and performs the process shown in FIG. 12A and FIG. 12B instead of the process shown in FIG. 8A and FIG. 8B of the first embodiment.

A description will now be given of the operation shown in FIG. 11A and FIG. 11B, and FIG. 12A and FIG. 12B performed by the ECU of the second embodiment.

Similar to the primary pulse setting process shown in FIG. 5A of the first embodiment, FIG. 11A is a flow chart showing a primary injection pulse setting process of outputting a primary injection pulse signal performed by the CPU 21 in the ECU of the second embodiment.

When compared with the primary pulse setting process shown in FIG. 5A, in the primary pulse setting process shown in FIG. 11A, step S140 is added immediately following step S130. In step S140, the capture and time comparison matching register 61 is set as a capture register.

Further, similar to the process shown in FIG. 5B of the first embodiment, FIG. 11B is a flow chart showing a process in the pulse OFF condition performed by the CPU 21 in order to output the secondary injection pulse signal.

The CPU 21 performs the process under the pulse OFF condition when the level of the injection pulse signal is switched from High level to Low level.

When compared with the process under the pulse ON state shown in FIG. 5B, in the process under the pulse OFF state shown in FIG. 11B, the process of step S205 shown in FIG. 5B is eliminated in the second embodiment, and additional process of step S243 to 247 are performed instead of the process of step S240 shown in FIG. 5B.

Firstly, the CPU 21 reads the value stored in the capture and time comparison matching register 61. That is, at step S140 shown in FIG. 11A, the capture and time comparison matching register 61 is set as a capture register and stores the value set in the time counter 34, which is the value of the time counter 34 when the primary injection pulse signal is switched from Low level to High level (namely, at the time when the crank angle reaches the primary injection start angle "an1") after the comparator 33 outputs the angle comparison matching signal. The CPU 21 reads the value captured by the capture and time comparison matching register 61.

Next, in step S245, the CPU 21 adds the counted value stored in the time counter 34 to the value which is read in step S243 (namely, which is stored in the capture and time comparison matching register 61). The CPU 21 then outputs the added one as the time "t2" which is the elapsed time of the regular time length "TL" counted from the pulse OFF time "t1", where the counted value stored in the time counter 34 is a time obtained by adding the primary fuel injection time "Tf1" and the regular time length "TU". That is, the CPU 21 in the timer module 59 in the ECU according to the second embodiment calculates a prediction value to be set in the timer counter 34 as the time "t2". The prediction value is an elapsed time of "Tf1+TL" counted from the time at which the primary injection pulse signal is switched to High level.

Further, at step S247, the CPU 21 sets the capture and time comparison matching register 61 as the time comparison matching register. The operation flow then goes to step S250.

Like the process shown in FIG. 5B of the first embodiment, the CPU 21 sets the time "t2" calculated in step S245 to the capture and time comparison matching register 61 in step S250.

As described above, according to the second embodiment, the primary injection start angle "an1" is set to the angle comparison matching register 32 and the capture and time comparison matching register 61 is used as a capture register when the mode set value of 2 is set to the switch circuit 38 in the primary pulse setting process shown in FIG. 11A.

In the pulse OFF process shown in FIG. 11B, the CPU reads the data stored in the capture and time comparison matching register 61 as the capture register, which indicates the time value stored in the time counter 34 at which the primary injection pulse signal is switched from Low level to High level, and the CPU 21 calculates the time "t2" to be set into the capture and time comparison matching register 61 as the time comparison matching register.

It is thereby possible for the CPU 21 to easily obtain the precious value stored in the time counter 34, which indicates the time at which the primary injection pulse signal is switched from Low level to High level. Accordingly, it is possible to set the precious data as the time "t2" into the capture and time comparison matching register 61 which acts as the time comparison matching register. Although the timer module 29 of the first embodiment shown in FIG. 5B involves a possibility to generate an error caused by a processing delay in step S205, the timer module 59 of the second embodiment eliminates such a possibility.

The primary injection pulse signal "an1" used in the second embodiment corresponds to the specified angle before the target angle as the output-inversion angle defined in claims. That is, the timing at which the primary injection pulse signal is switched to High level corresponds to the reference timing at a specified time.

The value "Tf1+TL" corresponds to the regular time period as defined in claims. Further, the process of step S110 shown in FIG. 11A and the process of steps S230 to S250 shown in FIG. 11B correspond to the process performed by the register value setting means defined in claims.

Similar to the process of the first embodiment shown in FIG. 8A, FIG. 12A is a flow chart showing the ignition pulse ON setting process of switching Low level of the ignition pulse signal to High level by the CPU 21 according to the second embodiment.

In the ignition pulse ON setting process shown in FIG. 12A, when compared with the ignition pulse ON setting process shown in FIG. 8A, the process of step S340 is added after step S330. In the second embodiment, it is so set that the capture and time comparison matching register 61 serves as a capture register.

Further, like the process of the first embodiment shown in FIG. 8B, FIG. 12B is a flow chart showing the process under the ignition pulse ON condition according to the second embodiment, where the ignition pulse signal is switched from High level to Low level. The process under the ignition pulse ON condition is performed when the ignition pulse signal is switched from Low level to High level.

In the process under the pulse ON condition shown in FIG. 12B according to the second embodiment, the process of step S405 is eliminated from the process under the pulse ON condition of the first embodiment as shown in FIG. 8B, and the process of steps S433 to S437 are added instead of step S430.

At step S433 in the process shown in FIG. 12B, the CPU 21 reads the value stored in the capture and time comparison matching register 61 that is set as the capture register in step S340 shown in FIG. 12A, and into which the value stored in the time counter 34 has already been captured. The value stored in the time counter 34 is a value when the ignition pulse signal is switched from Low level to High level when it receives the angle comparison matching signal transferred from the comparator 33. That is, the CPU 21 reads such a captured value stored in the capture and time comparison matching register 61.

At step S435, the CPU 21 adds the count value (more specifically, that is the value obtained by dividing the regular time length "TH" by the time period of one clock cycle used in the time counter 34) during the regular time length "TH" stored in the time counter 34 to the value read in step S433 (that is the value stored in the capture and time comparison matching register 61). The CPU 21 then outputs the addition result as the time "t12" that is the elapsed time of the regular time period "TH" counted from the pulse ON time "t11".

Similar to the process of the first embodiment shown in FIG. 8B, the CPU 21 of the second embodiment sets the capture and time comparison matching register 61 which acts as the time comparison matching register at step S437. Then, the operation step goes to S440 in which the time "t12" calculated in step S453 is set to the capture and time comparison matching register 61 set as the time comparison matching register.

As described above, according to the second embodiment, the pulse ON angle "an11" is set to the angle comparison matching register 32 in the pulse ON setting process shown in FIG. 12A, and the capture and time comparison matching register 61 is used as the capture register when the mode set value of 2 is set into the switch circuit 38.

In the process of the pulse ON condition shown in FIG. 12B, the CPU 21 reads the value of the time counter 34 at the pulse ON time "t11" from the capture and time comparison matching register 61. The CPU 21 then calculates the time "t12" to be set into the capture and time comparison matching register 61 as the time comparison matching register based on the read value.

It is therefore possible to easily obtain the precious value in the time counter 34 at the pulse ON time "t11", and thereby possible to set the precious value regarding the time "t12" into the capture and time comparison matching register 61 that acts as the time comparison matching register. That is, the second embodiment can eliminate a possibility to cause an error caused by the processing delay occurred in step S405.

In the ignition pulse signal of the second embodiment, the pulse ON angle "an11" corresponds to the specified angle before the target angle as the output-inversion angle, and the timing of the pulse ON angle "an11" (that is the timing at which the ignition pulse signal is switched to High level) corresponds to the reference timing at a specified time. The time length "TH" corresponds to the regular time length defined in claims. Further, the process at step S310 shown in FIG. 12A and the process from step S420 to step S440 corresponds to the process by the register value setting process defined in claims of the present invention.

As set forth in detail, although the concept of the present invention is not limited by the above embodiments, it is possible to apply the present invention to various modifications within the scope of the present invention. For example, it is acceptable that the rotary body is a body other than the crank shaft of the engine used in the first and second embodiments. It is further acceptable to incorporate both a time comparison matching register and a capture register instead of the capture and time comparison matching register used in the second embodiment. That is, it is possible to incorporate an additional capture register in addition to the time comparison matching register 35 for the timer module 29 shown in FIG. 2. In this case, it is possible to eliminate both the processes of step S140 and step S247 from the flow chart shown in FIG. 11A and FIG. 11B and to eliminate both the processes of step S340 and step S437 from the flow chart shown in FIG. 12A and FIG. 12B.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalent thereof.

What is claimed is:

1. A signal output unit comprising:

an angle counter configured to perform a count operation in synchronization with a rotation of a rotary body and to output an angle count value indicating a rotation angle of the rotary body;

a first register in which a first comparison value is set, which is compared with the angle count value;

a first comparator configured to compare the angle count value with the first comparison value, and to output a first comparison matching signal when the angle counter value reaches the first comparison value;

a time counter configured to perform a counting operation every a regular interval and to output a time count value;

a second register in which a second comparison value is set, which is compared with the time count value; and a second comparator configured to compare the time count value with the second comparison value, and to output a second comparison matching signal when the time count value reaches the second comparison value, wherein the signal output unit inverts a specified level of an output signal thereof and outputs the output signal of the inverted level outside when the first comparator outputs the first comparison matching signal and the second comparator outputs the second comparison matching signal.

2. The signal output unit according to claim 1, wherein the specified level of the output signal is a level indicating an interruption of an electric power supply to a control target to be controlled according to the output signal, and the inverted level of the output signal indicates an initiation of the electric power to the control target.

3. The signal output unit according to claim 2, further comprising a capture register configured to capture the time count value output from the time counter when the first comparator outputs the first comparison match signal.

4. An electronic control unit comprising:

the signal output unit according to claim 2; and a controller comprising register value setting means configured to set to the first register a target angle of the rotary body as an output-inversion angle at which the level of the output signal from the signal output unit is inverted from the predetermined level to its inversion level, and configured to add a count value for a regular time period counted by the time counter to a count value of the time counter at a reference timing at a specified time, and to store the addition result to the second register.

5. The signal output unit according to claim 1, wherein the specified level of the output signal indicates initiation of electric power supply to a control target to be controlled according to the output signal, and the inverted level of the output signal indicates interruption of the electric power supply to the control target.

6. The signal output unit according to claim 5, further comprising a capture register configured to capture the time count value output from the time counter when the first comparator outputs the first comparison match signal.

7. The signal output unit according to claim 1, further comprising a capture register configured to capture the time count value output from the time counter when the first comparator outputs the first comparison match signal.

8. An electronic control unit comprising:

the signal output unit according to claim 1; and a controller comprising register value setting means configured to set to the first register a target angle of the rotary body as an output-inversion angle at which the level of the output signal from the signal output unit is inverted from the predetermined level to its inversion level, and configured to add a count value for a regular time period counted by the time counter to a count value of the time counter at a reference timing at a specified time, and to store the addition result to the second register.

9. The electronic control unit according to claim 8, wherein the signal output unit further comprises a capture register configured to capture the time count value provided from the time counter when the first comparator outputs the first comparison match signal, the reference timing indicates a specified angle before the output-inversion angle of the rotation angle of the rotary body, and the register value setting means is configured to set the specified angle to the first register before the reference timing occurs, configured to read the time count value stored in the capture register during a time from the reference timing to the time at which the rotation angle of the rotary body reaches the target angle as the output-inversion angle, configured to add the count value counted by the timer counter for the regular time period to the readout time count value, and configured to store the added value to the second register.

10. The electronic control unit according to claim 8, wherein on receiving the output signal from the signal output unit, the controller generates and outputs an ignition pulse signal to an injector mounted on a vehicle.

* * * * *